(12) United States Patent
Tanoue et al.

(10) Patent No.: US 11,245,596 B2
(45) Date of Patent: *Feb. 8, 2022

(54) MANAGEMENT SYSTEM THAT MANAGES COMPUTER SYSTEM

(71) Applicant: Hitachi, Ltd., Tokyo (JP)

(72) Inventors: Shiro Tanoue, Tokyo (JP); Kousuke Shibata, Tokyo (JP); Yuusuke Asai, Tokyo (JP); Tsutomu Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 16/674,058

(22) Filed: Nov. 5, 2019

(65) Prior Publication Data

US 2020/0076706 A1 Mar. 5, 2020

Related U.S. Application Data

(63) Continuation of application No. 15/671,536, filed on Aug. 8, 2017, now Pat. No. 10,505,821, which is a continuation of application No. 14/427,641, filed as application No. PCT/JP2014/077209 on Oct. 10, 2014, now Pat. No. 9,762,453.

(51) Int. Cl.
*G06F 3/0482* (2013.01)
*H04L 12/24* (2006.01)

(52) U.S. Cl.
CPC .......... *H04L 41/22* (2013.01); *G06F 3/0482* (2013.01); *H04L 41/0853* (2013.01); *H04L 41/12* (2013.01); *H04L 41/0893* (2013.01)

(58) Field of Classification Search
None
See application file for complete search history.

(56) References Cited

U.S. PATENT DOCUMENTS

| | | | |
|---|---|---|---|
| 7,315,985 B1 | 1/2008 | Gauvin et al. | |
| 7,475,363 B1 | 1/2009 | Yehuda et al. | |
| 2008/0016311 A1* | 1/2008 | Harada | G06F 3/0658 711/170 |
| 2009/0249213 A1* | 10/2009 | Murase | G06F 3/0482 715/735 |

(Continued)

FOREIGN PATENT DOCUMENTS

| | | |
|---|---|---|
| JP | 2008-77128 | 4/2008 |
| JP | 2008312023 | 12/2008 |

(Continued)

OTHER PUBLICATIONS

Japanese Office Action received in corresponding Japanese Application No. 2015-091276 dated Feb. 23, 2016.

(Continued)

*Primary Examiner* — Xuyang Xia
(74) *Attorney, Agent, or Firm* — Mattingly & Malur, PC

(57) ABSTRACT

A management system displays a list of elements of some element types from among a plurality of element types, and receives a selection of the two or more elements from the list. The management system displays a topology which is configured of the two or more selected elements and an element (related element) related to the two or more selected elements and in which the two or more selected elements and the related element are segmented by element types.

15 Claims, 25 Drawing Sheets

(56) References Cited

U.S. PATENT DOCUMENTS

| | | | |
|---|---|---|---|
| 2009/0276714 A1 | 11/2009 | Kandlikar et al. | |
| 2010/0180230 A1 | 7/2010 | Bogner et al. | |
| 2011/0265006 A1* | 10/2011 | Morimura | G06F 11/079 715/736 |
| 2012/0066376 A1* | 3/2012 | Nagura | H04L 63/1416 709/224 |
| 2012/0117581 A1* | 5/2012 | Curtis | G06F 3/0484 725/9 |
| 2013/0232173 A1* | 9/2013 | Maruyama | G06F 3/04842 707/797 |
| 2014/0267788 A1* | 9/2014 | Bowler | H04N 7/10 348/192 |
| 2015/0067400 A1* | 3/2015 | Ishii | G06F 11/079 714/37 |
| 2015/0170076 A1 | 6/2015 | Pawar et al. | |

FOREIGN PATENT DOCUMENTS

| | | |
|---|---|---|
| JP | 2011517346 | 6/2011 |
| JP | 2013-3668 | 1/2013 |
| WO | 2009/122626 | 10/2009 |
| WO | 2013128974 | 9/2013 |

OTHER PUBLICATIONS

Written Opinion of the International Searching Authority for International Application No. PCT/JP2014/077209 dated Dec. 16, 2014.

* cited by examiner

FIG. 4

Element table
400

| Element ID | Element name | Element type | Layer name | Element detail |
|---|---|---|---|---|
| 1 | VM#01 | VM | Servers | N/A |
| 2 | Storage#01 | Storage | Storages | Customer (Company_XX) |
| .... | .... | ... | .... | .... |

FIG. 5

Related element table
500

| Element ID | Child element ID |
|---|---|
| 4 | 1 |
| .... | .... |
| 6 | 7 |
| .... | .... |

FIG. 6

Customer table
600

| Element ID | Customer ID |
|---|---|
| 4 | 1 |
| 6 | 5 |
| .... | .... |

FIG. 7

Event table
700

| Element ID | Element type | Occurrence time point | Message ID |
|---|---|---|---|
| 1 | Error | 2014/02/11 09:00:11 | 100 |
| 3 | Warning | 2014/02/21 04:52:21 | 201 |
| .... | .. | ... | .... |

FIG. 8

Customer details table
800

| Customer ID | Customer name | Grade | Telephone no. | Mail address |
|---|---|---|---|---|
| 1 | KK | Gold | xxx-xxxx-xxxx | aaa@xxx.com |
| 2 | SS | Bronze | yyy-yyyy-yyyy | bbb@yyy.com |
| .... | .. | .. | .... | .... |

FIG. 9

Screen transition table
900

| Screen history ID | Screen type | Key element | Element type | Group type |
|---|---|---|---|---|
| 1 | List | N/A | VM | Cluster |
| 2 | E2E | VM#01 | VM | N/A |
| 3 | E2E | Storage#01 | Storage | N/A |
| 4 | List | N/A | VM | Customer |
| .... | .... | .. | .... | .... |

MANAGEMENT SYSTEM THAT MANAGES COMPUTER SYSTEM

TECHNICAL FIELD

The present invention generally relates to a management of a computer system including a plurality of element types of a plurality of elements.

BACKGROUND ART

As a computer system undergoes an increase in size and complexity, it becomes more important to manage and operate elements of a computer system by using a UI (user interface). For example, comprehension of an influence range of a fault occurring in a computer system and specifying of a cause of the fault are an example of an important use case in the operation management, and the UI for the operation management plays an important role.

When there are a small number of elements to be managed, the use of one screen may suffice to compare all the elements including the element in which the fault occurs. However, when the computer system undergoes an increase in size and complexity, there are a large number of elements to be managed, which may increase the number of elements in which the fault occurs and the number of the elements related thereto. For this reason, one screen may not suffice to display all the elements in which the fault occurs and all the elements related thereto.

For example, PTL 1 discloses that the elements to be managed are refined according to a condition (for example, an OS (operating system) or a vendor) and the refined elements are displayed (for example, FIG. 21).

CITATION LIST

Patent Literature

[PTL 1] WO2009/122626

SUMMARY OF INVENTION

Technical Problem

According to the technique in PTL 1, it is difficult to make a guess at under which condition the elements should be refined when a fault with an unknown cause occurs. Thus, it may not necessarily be possible to effectively refine the elements.

This type of problem may occur not only in the management relating to the fault but also in other managements.

Solution to Problem

A management system displays a list of elements of some element types from among a plurality of element types, and receives a selection of an element from the list. The management system displays a topology which is configured of the selected element and an element (related element) related to the selected element and in which the selected element and the related element are segmented by element types.

Advantageous Effects of Invention

Elements to be displayed are effectively refined, and visibility improves.

BRIEF DESCRIPTION OF DRAWINGS

FIG. 4 shows one example of an element table.
FIG. 5 shows one example of a related element table.
FIG. 6 shows one example of a customer table.
FIG. 7 shows one example of an event table.
FIG. 8 shows one example of a customer details table.
FIG. 9 shows one example of a screen transition table.

DESCRIPTION OF EMBODIMENTS

Figure 1:
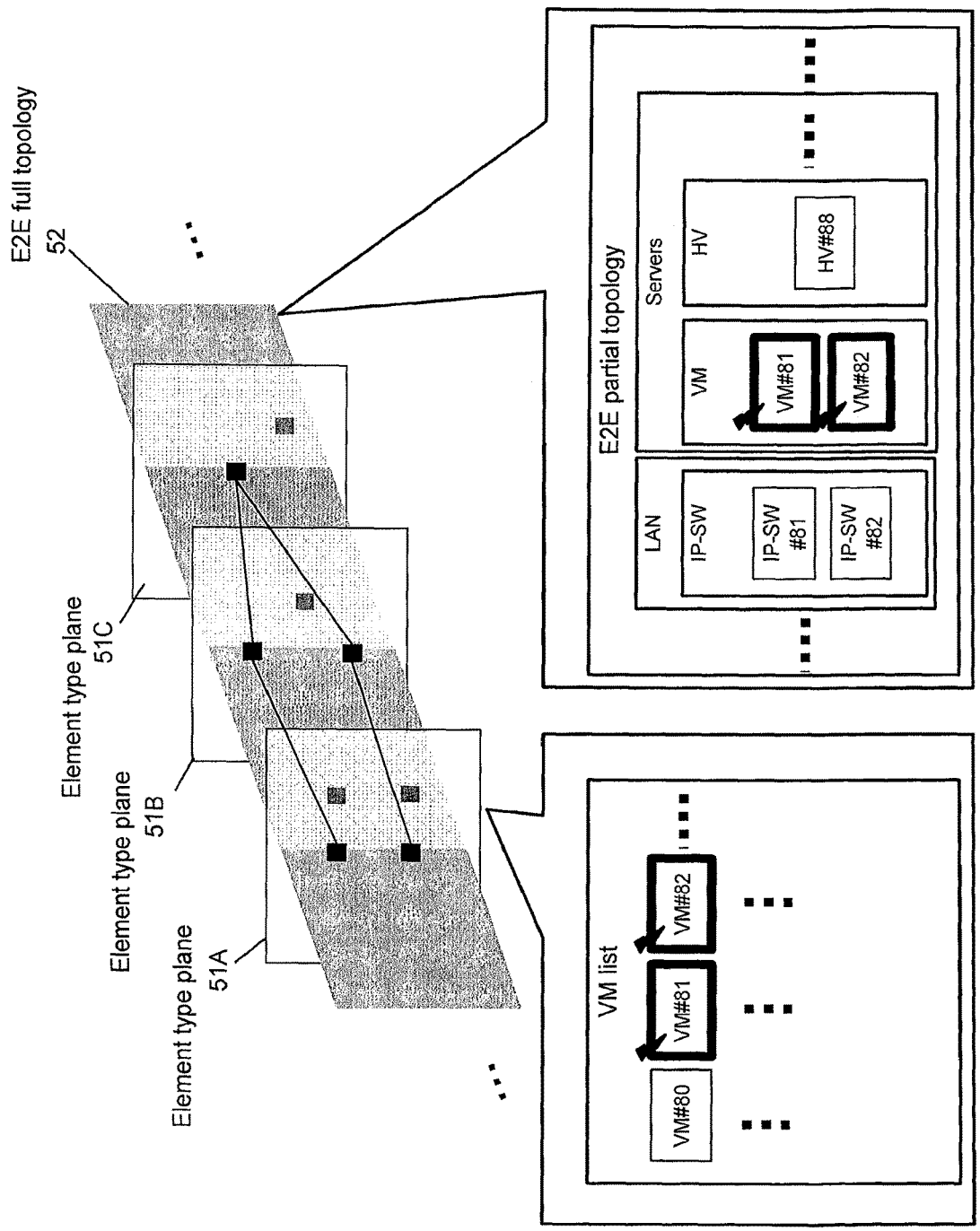
FIG. 1 shows an overview of an embodiment.

Hereinafter, an embodiment will be described.

It is noted that, in the following description, expressions such as "abc table" are in some cases used to describe information; however, the information may be expressed in a data configuration other than a table. In order to show that the information does not depend on a data configuration, at least one of the items in the "abc table" may be called "abc information".

Also, in the following description, a process may be explained with "program" as a grammatical subject. However, a program is executed by a processor (for example, a CPU (Central Processing unit)), thereby a predetermined process being performing by properly using at least one of a storage resource (for example, a memory) and a communication interface device (for example, a communication port), etc., and thus a grammatical subject of a process may be a processor. The process described while a program is treated as a grammatical subject may be a process performed by a processor or an apparatus having a processor. Additionally, the processor may include a hardware circuit that implements part or all of the process. The program may be installed from a program source to an apparatus such as a computer. A program source may, for example, be a program distribution server or a computer-readable storage media. When the program source is the program distribution server, the program distribution server includes a processor (for example, a CPU) and a storage resource, and the storage resource further stores a distribution program and a program to be distributed. Then, when the processor of the program distribution server executes the distribution program, the processor of the program distribution server distributes the program to be distributed, to another computer.

Moreover, the management system may be configured of one or more computers. Specifically, for example, when a management computer displays information (specifically, when a management computer displays information on a display device thereof or a management computer transmits display information to a remote display computer), the management computer is the management system. Also, for example, when the functions identical or similar to those of the management computer are achieved by a plurality of computers, the plurality of computers (which may include a display computer when display is performed by the display computer) are the management system. It may be possible that the information is input and output, by an input/output device provided in the computer, to and from the computer. Examples of the input/output device may include a display device, a key board, and a pointing device; however, in place of or in addition to at least one of these, another device may be adopted. Further, as an alternative to the input/output device, a serial interface device or an Ethernet interface device (Ethernet is a registered trademark) may be adopted, such an interface device may be coupled to a display computer having a display device, a key board, and a pointer device, and the computer may transmit display information to the display computer and receive input information from the display computer, whereby the information may be output (for example, displayed) and input. In the present embodiment, a management server 557 is a management computer, and a management client 555 is a display computer.

Further, in the following description, an "element" means a constituent element of a computer system, and specifically, it is a generic name of each of a plurality of nodes (apparatuses) configuring the computer system and each of a plurality of components provided in each node. As a node, not only a physical node (for example, a network switch), but also a logical node (for example, a virtual machine) may be included. Similarly, as a component, not only a physical component (for example, a microprocessor), but also a logical component (for example, LDEV (logical volume)) may be included.

Further, in the following description, a "related element" of an element (an element related to the element) is an element directly or indirectly linked to the element. When the related element is "directly" linked to the element, no other element is interposed between the element and the related element, and when the related element is "indirectly" linked to the element, one or more other elements are interposed between the element and the related element. It may call the related element higher than the element as "upper related element", and the related element lower than the element as "lower related element". Further, from among the upper related elements, a related element directly linked to an element may be called "parent element", and from among the lower related elements, a related element directly linked to an element may be called "child element". A concept of the "upper/lower" or the "parent/child" may change depending on what a user engages to manage (for example, monitor), or may be omitted. For example, when the relation is a "connection relation" between a server and a storage system via an FC (Fibre Channel) switch, it is not possible to uniquely determine whether the server or the storage system is an upper or a parent, and it is possible to determine, depending on the user's standpoint, whether the server is an upper or the storage system is an upper, or whether or not the concept of an upper or lower element is brought. On the contrary, when the relation is an inclusion (for example, a node includes a component), a concept that a lower (or a child) of a node is a component may be generally accepted irrespective of the user's standpoint.

Further, in the following description, a name or an ID is used as identification information of an element; however, the ID and the name may be mutually replaceable, or another type of identification information may be used instead of or in addition to at least one of these.

Further, in the following description, an operation by a user (for example, an administrator), by using an input device, onto a GUI (Graphical User Interface) as a management screen of a computer system is termed as "user operation". The input device used for the user operation generally is a pointing device or a touch screen.

Firstly an overview of the present embodiment will be described.

In recent years, a computer system undergoes an increase in size and complexity due to, for example, at least one of the following factors:

(*) A process handled by a computer system increases in volume;

(*) A large number of processes are executed by a computer system as in a cloud service;

(*) The number of types of a node in a computer system increases;

(*) An internal structure of a node undergoes complexity, and the number of types of a component included in the node (for example, a logical component and a physical component) increases, and further, there arises a need of managing these;

(*) A virtualization technology (for example, a server virtualization, a network virtualization, a storage virtualization, and a data center virtualization) becomes widely accepted, which enables division and collection of apparatuses; and (*) Deploy and migration techniques are well advanced.

Here, "increase in size" means that the number of elements, such as nodes configuring a computer system and components of the node, to be managed in the computer system is increased. In addition, "increase in complexity" means at least one of the followings: due to the increase in type of elements to be managed, a relation between the elements reaches a relation of M:1, 1:N, and M:N (M and N are an integer equal to or larger than 2); at least one of the M and N becomes large in value; and a relation between the elements changes every moment.

On the other hand, in a general topology display technique, all display objects of the elements to be displayed are displayed, and a line is displayed between the display objects so as to represent a relation between the elements. However, when the general topology display technique is applied to a computer system that undergoes an increase in size and complexity, a user is not capable of efficiently and quickly grasping the problematic element and grasping a state of the related element for the analysis. The reason therefor may result from at least one of the following:

(A) When the computer system increases in size, the number of display objects to be displayed is so greatly increased, so that work efficiency is deteriorated. For example, when it is attempted to display the display objects of all the elements in one screen, a size of the display object of each element is small. On the other hand, when the size of each display object is remained the same, it is not possible to display the display objects of all the elements in one screen, and a user is required to grasp the relation between the elements while scrolling a screen, and hence, troublesome;

(B) When the number of element types is increased, it is not possible to discriminate the element types any more by at least one of a shape and a color of the display object. As a practical problem, when the size of the display object is too large, the number of display objects to be displayed in one screen is reduced; on the other hand, when a large number of element types are represented by an icon having a small size, the user is not capable of distinguishing the shape of an icon unless the icon is more closely observed, as a result of which the work efficiency is deteriorated;

(C) When the computer system undergoes an increase in size and complexity, it is necessary to draw a large number of display objects and relation lines between the display objects. Thus, it is not possible to grasp the relation between the elements; and (D) It is assumed that in order to ensure that the topology display is easily seen, in consideration of the relation between the elements, the management system is capable of arranging the display object in a screen to achieve the smallest possible overlapping of the relation lines. However, when the relationship between the elements is time-sequentially changed, this function (function of adjusting the arrangement position of the display object) may allow the arrangement of the display objects on the screen to be different before and after the relationship between the elements is changed. As a result, the user is not capable of efficiently finding a desired display object from the screen.

As described above, when the system increases in size and complexity, visibility of the management system is deteriorated. Consequently, it becomes difficult to estimate a root cause of fault, which is performed when the fault occurs. Thus, in the present embodiment, from among various screens representing a state of an element, a screen with an aspect as an element list is associated with a screen with an aspect as a topology of the element, and transition (switch) from the screen with one aspect to the screen with the other aspect is enabled, whereby it is possible for a user using a UI to seamlessly perform a series of tasks from confirming and refining a fault occurrence location to specify a fault influence range. This facilitates analysis and estimation of a root cause of fault performed by a user.

FIG. 1 shows an overview of an embodiment.

In a computer system, a plurality of element types have a hierarchical relationship, and a plurality of elements configuring the computer system are associated with each other in a tree shape along the layers of the element types. In the present embodiment, with focusing on such a configuration, and as an aspect of managing a computer system, two aspects are adopted: an aspect of an E2E (End to End) full topology (space) 52 of elements formed in a tree shape along the layers of the element types; and an aspect of a plurality of element type planes (cross-sections) 51A, 51B, 51C . . . obtained by segmenting the E2E full topology (space) 52 for each of the plurality of element types. Each of the element type planes 51A, 51B, 51C . . . corresponds to an element list of an element type.

For example, it is assumed that the element type plane 51A corresponds to an element type "VM" (VM is short for a virtual machine), and the management system accepts a selection of the element type "VM" from the plurality of element types. In this case, the management system displays an element list of the selected element type "VM". The element list is a list of elements (that is, VMs) belonging to the selected element type "VM". The management system, when accepting the selection of elements "VM #81" and "VM #82" (for example, elements in which a fault occurs) from the element list, specifies an element related to the selected elements "VM #81" and "VM #82" (that is, executes refining of elements), from the E2E full topology 52, and displays an E2E partial topology, which is a topology configured of the selected elements and the specified related element.

Thus, in the present embodiment, a guess at refining elements is made according to a viewpoint of a specific element (hereinafter, may be referred to as a "key element") such as an element in which the fault occurs from an element list of an element type, and, a display is automatically transitioned to the E2E partial topology including elements related to the key element. This enables a user (for example, an administrator) using a UI to seamlessly perform a series of tasks such as a selection of an element and confirmation of a result of refinement using the selected element (for example, confirmation of a fault influence range). This improves the visibility of the UI and facilitates management such as a fault cause analysis.

In addition to the transition (switching) from the element list to the E2E partial topology, the management system is capable of executing transition from the E2E partial topology to the element list (element list of an element type of the element selected from the E2E partial topology) and transition to another E2E partial topology (E2E partial topology including an element related to the element selected from the E2E partial topology) from the E2E partial topology.

The present embodiment will be described in detail, below.

Figure 2:
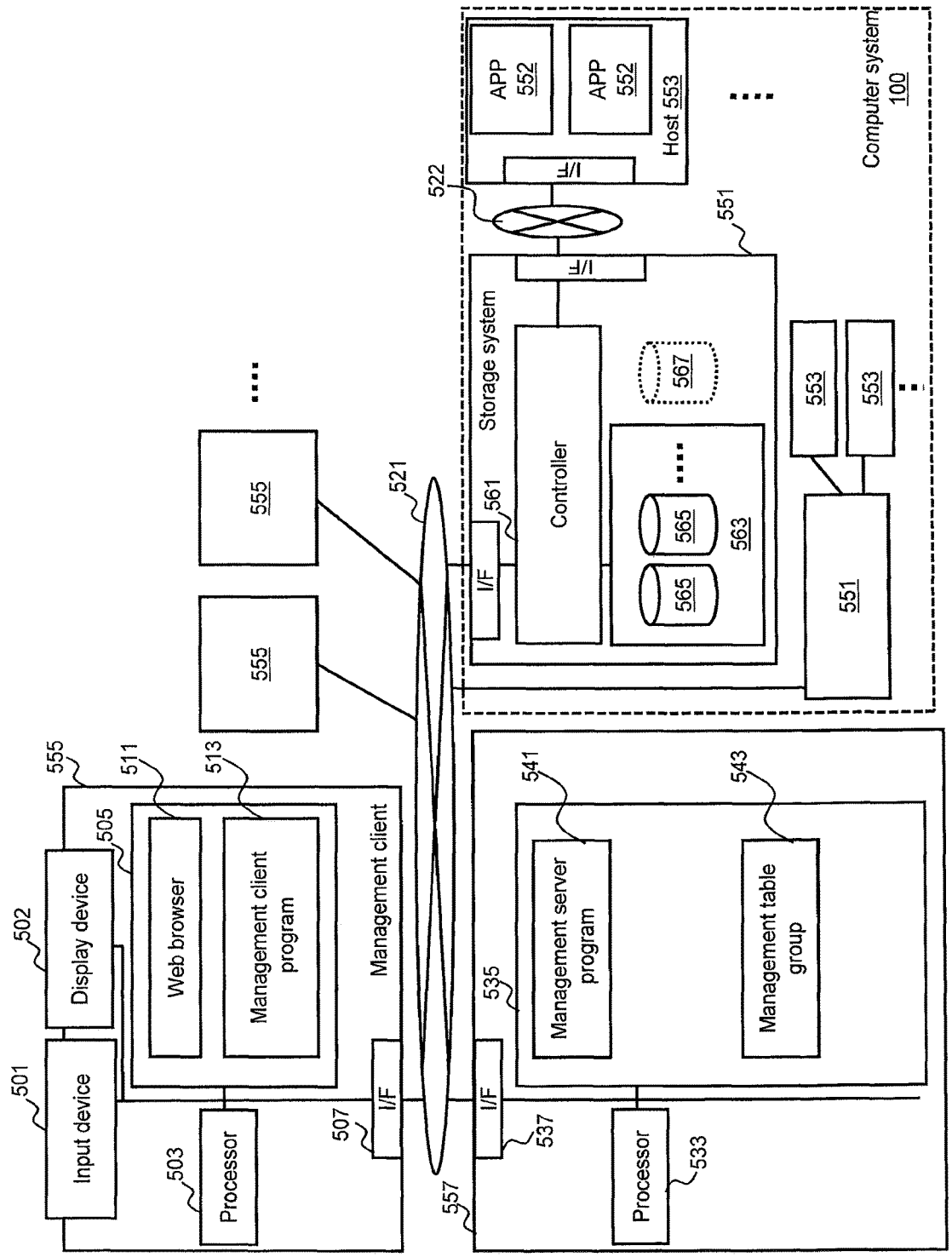
FIG. 2 shows a configuration of a computer system and a management system according to an embodiment.

FIG. 2 shows a configuration of a computer system and a management system according to an embodiment.

A computer system 100 includes one or more hosts 553 and one or more storage systems 551 coupled to the one or more hosts 553. The storage system 551 is coupled to the host 553 via, for example, a communication network 521 (for example, SAN (Storage Area Network) or LAN (Local Area Network)).

The storage system 551 has a physical storage device group 563 and a controller 561 coupled to the physical storage device group 563.

The physical storage device group 563 has one or more PGs (Parity Groups). The PG may be called a RAID (Redundant Array of Independent (or Inexpensive) Disks) group. The PG is configured of a plurality of physical storage devices, and stores data according to a predetermined RAID level. The physical storage device is an HDD (Hard Disk Drive) or an SSD (Solid State Drive), for example.

The storage system 551 has a plurality of logical volumes. As the logical volume, there is a virtual logical volume (virtual volume) 567 that complies with Thin Provisioning or a storage virtualization technology as well as a substantial logical volume (real volume) 565 based on the PG. One storage system 551 may not necessarily have a plurality of types of logical volumes. For example, as the logical volume, the storage system 551 may have the real volume 565 only. The virtual volume that complies with Thin Provisioning is allocated with a storage area from a pool. The pool is a storage area group based on one or more physical storage devices (for example, PGs), and may be a set of one or more logical volumes, for example. The pool may be a pool stored with a difference between an original logical volume and a snap-shot thereof instead of a pool having the storage area allocated to the virtual volume that complies with Thin Provisioning.

The controller 561 includes a plurality of devices, for example, a port, an MPB (blade (circuit board)) having one or more microprocessors (MPs)) and a cache memory. For example, the port receives an I/O (Input/Output) command (a write command or a read command) from the host 553, and the MP provided in the MPB controls I/O of the data that complies with the I/O command. Specifically, for example, the MP specifies the logical volume of an I/O destination from the received I/O command, and performs I/O of data with respect to the specified logical volume. The data that undergoes I/O with respect to the logical volume is temporarily stored in the cache memory.

The host 553 may be either a physical computer or a virtual computer. In the host 553, one or more application programs (APPs) 552 are executed. When the APP 552 is executed, the I/O command with which the logical volume is designated is transmitted from the host 553 to the storage system 551.

As described above, the computer system 100 has a plurality of hierarchical elements. Specifically, the plurality of elements include an element of two or more element types from among the APP 552, the host 553, the storage system 551, the controller 561, the port, the MPB, the cache memory, the logical volume, and the PG, for example. When the plurality of elements in the same layer are grouped, an element in an upper layer than the layer may be defined. The "element" may include a substantive element such as an APP and a logical volume and a virtual element which is a group of a plurality of substantive elements.

The management system includes the management server 557 and one or more management clients 555 coupled to the management server 557. The management server 557 is coupled to the management client 555 via a communication network (for example, LAN, WAN (World Area Network), or Internet) 521.

The management client 555 has an input device 501, a display device 502, a storage device (for example, a memory) 505, a communication interface device (hereinafter, I/F) 507, and a processor (for example, a CPU (Central Processing Unit)) 503 coupled to these devices. The input device 501 is a pointing device and a key board, for example. The display device 502 is a device having a physical screen for showing information, for example. A touch screen obtained when the input device 501 and the display device 502 are integrated may be adopted. The I/F 507 is coupled to the communication network 521, and the management client 555 is capable of communicating with the management server 557 via the I/F 507. It is noted that the communication network 521 may be partly or entirely common with a network for coupling the host 553 and the storage system 551.

A storage resource 505 has at least a main storage device (typically, a memory) from among a main storage device and an auxiliary storage device, for example. The storage resource 505 is capable of storing a computer program executed by the processor 503 and information used for the processor 503. Specifically, the storage resource 505 stores a Web browser 511 and a management client program 513, for example. The management client program 513 may be an RIA (Rich Internet Application). Specifically, the management client program, which is a program file, may be downloaded from the management server 557 (or another computer) and stored in the storage resource 505, for example.

The management server 557 has a storage resource 535, an I/F 537, and a processor (for example, CPU (Central Processing Unit)) 533 coupled thereto. The I/F 537 is coupled to the communication network 521, and the management server 557 is capable of communicating with the management client 555 via the I/F 537. The management server 557 is capable of, via the I/F 537, receiving an indication that complies with a user operation and drawing a display object in a layout region. Thus, the I/F 537 is one example of an I/O interface device. It is noted that the "layout region" used herein is a region in which the display object may be drawn. All or part of the range of the layout region is a display range in a frame (for example, a window) displayed by the Web browser 511 (or the management client program 513). A display image (including a display object) in the frame, in the layout region in which the display object is drawn may be called a display screen or a GUI screen. An object overlapping the display range from among the objects drawn in the layout region is displayed on the physical screen of the display device 502. Thus, drawing of the object in the layout region is substantially one example of displaying an object.

The storage resource 535 has at least a main storage device (typically, a memory) from among a main storage device and an auxiliary storage device, for example. The storage resource 535 is capable of storing a computer program executed by the processor 533 and information used for the processor 533. Specifically, the storage resource 535 stores a management server program 541 and a management table group 543, for example. The management table group 543 includes a hierarchical relationship (configuration information) of a plurality of elements provided in the computer system, fault information of each of the elements, etc. At least a part of the information in the management table group 543 may be collected by the management server program 541 and may be acquired by accessing another management system where the information is held. The management server program 541 receives an indication that complies with a user operation from the management client 555 and transmits information drawn in the layout region to the management client 555, for example.

Through a cooperation process among the management server program 541, the Web browser 511 (or an RIA execution environment of a client), and the management client program 513, a GUI screen display that reflects a user operation is realized. It may be possible that the management server program 541 creates a screen and provides display information for the created screen to the management client program 513 and the management client program 513 displays a screen on the basis of the display information, or a part of a screen creation process (for example, a drawing process) is off-loaded from the management server program 541 to the management client program 513. Examples of the cooperation include the following. To simplify the description, in the present embodiment, a case where (cooperation example 2) is adopted will be described; however, it goes without saying that the present invention is applicable to a cooperation example 1.

Cooperation Example 1

The management server program 541 transmits at least a part of the information provided in the management table group 543 to the Web browser 511 (or the management client program 513), and the Web browser 511 (or the management client program 513) stores the same in the storage resource 505 as temporary information. The Web browser 511 (or the management client program 513) draws the display object in the layout region (for example, newly draws, or scales the display object) on the basis of the indication that complies with a user operation and the temporary information.

Cooperation Example 2

The management server program 541 receives the indication that complies with the user operation on the display screen, from the Web browser 511 (or the management client program 513), creates display information of the display object on the basis of the indication and the management table group 543, and transmits the display information. The Web browser 511 (or the management client program 513) receives the display information, and draws the display object in the layout region in accordance with the display information. That is, in short, the management server program 541 draws the display object in the layout region. When an user operation is performed on the GUI screen, the Web browser 511 (or the management client program 513) transmits the indication that complies with the user operation to the management server program 541.

To simplify the description, it is assumed that display control is performed by the management server program 541, below.

Figure 3:
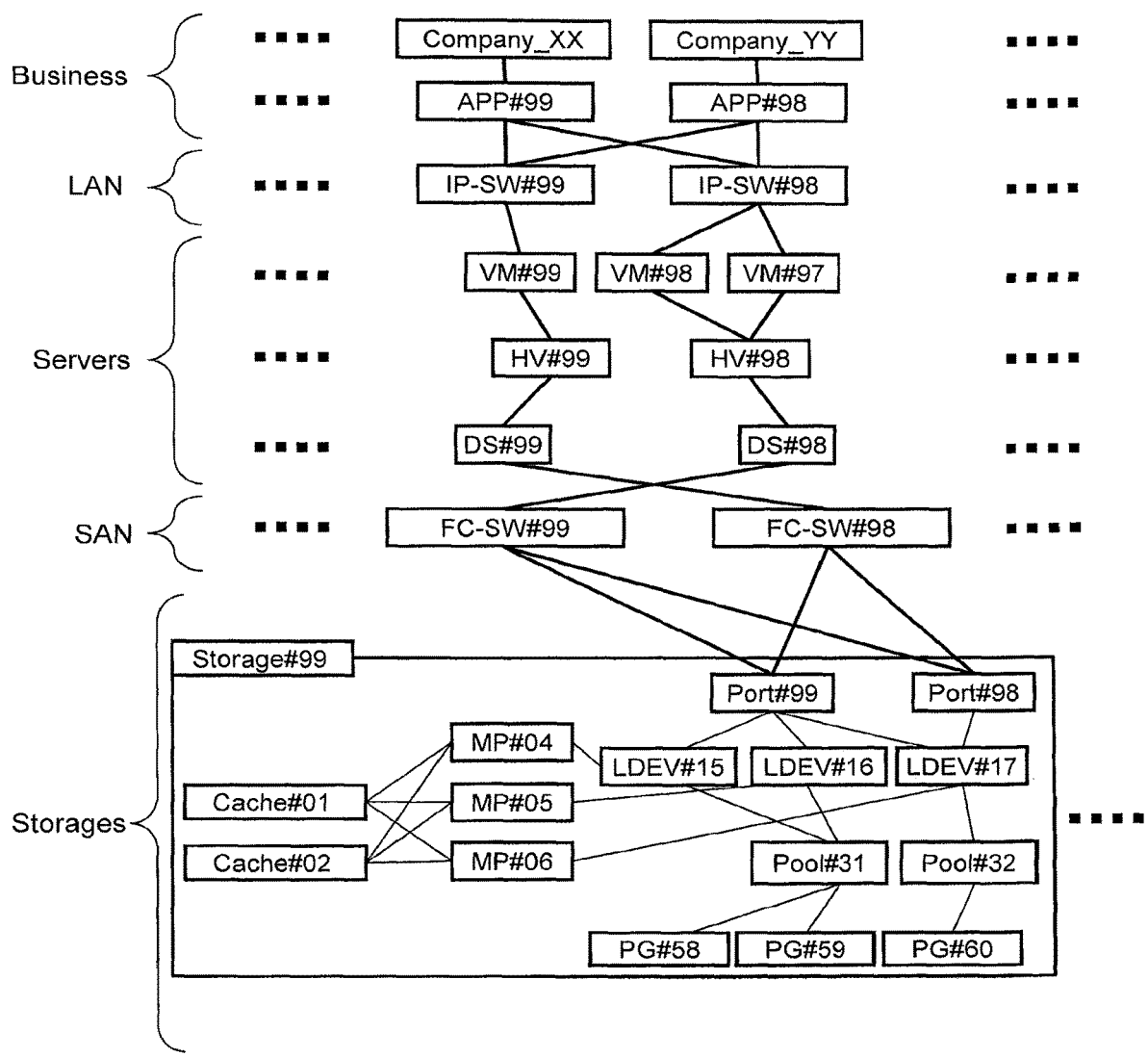
FIG. 3 shows one example of a configuration of an E2E full topology.

FIG. 3 shows one example of a configuration of an E2E full topology.

Examples of a plurality of layers include Business, LAN, Servers, SAN, and Storages in order from the top layer. An element type belonging to a first layer (top layer) "Business" is "Customer" and "APP". An element belonging to the element type "Customer" is "Company" (a company using an element (virtual machine (VM)) in the computer system 100), and an element belonging to the element type "APP" is "APP" (an APP executed in a host such as a VM or a physical machine). An element type belonging to a second layer "LAN" is "IP-SW", and an element belonging to the element type "IP-SW" is "IP-SW" (an IP switch in the LAN). An element type belonging to a third layer "Servers" is "VM", "HV" and "DS". An element belonging to the element type "VM" is "VM" (a virtual machine executed in the host), an element belonging to the element type "HV" is "HV" (hypervisor that controls one or more virtual machines and is executed in the host), and an element belonging to the element type "DS" is "DS" (a data store). The data store is an element recognized by the hypervisor as a storage device. An element type belonging to a fourth layer "SAN" is "FC-SW", and an element belonging to the element type "FC-SW" is "FC-SW" (an FC (Fibre Channel) switch in the SAN). An element type belonging to a fifth layer "Storages" is "Storages", and an element belonging to the element type "Storages" is "Storage" (a storage system). As an element type included in the element type "Storages", there are a plurality of component types in the storage system, such as "Port", "LDEV", "MP", "Pool", "PG", and "Cache". An element belonging to the element type "Port" is "Port" (a communication port that is coupled to an FC switch and that receives an I/O command from a virtual machine). An element belonging to the element type "LDEV" is "LDEV" (a logical volume (a real volume or a virtual volume)). An element belonging to the element type "MP" is "MP" (a microprocessor). An element belonging to the element type "Pool" is "Pool" (a storage area including a real area allocated to a virtual volume in accordance with Thin Provisioning). An element belonging to the element type "PG" is "PG" (a parity group). An element belonging to the element type "Cache" is "Cache" (a cache memory in which data input and output to and from a logical volume is temporarily stored).

A topology configuration as shown in FIG. 3 is a configuration specified from configuration information represented by the management table group 543. One or more element types may belong to one layer. Two or more elements of the same element type may configure one group, and in this case, a plurality of different groups may exist for one element type, and one or more elements of such element type may exist for each group. That is, the "layer" is an aggregation of different element types, and the "group" is an aggregation of different elements in the same element type. At least either one of the layer or the group may be defined by a user.

With reference to FIG. 4 to FIG. 9, one example of tables included in the management table group 543 will be described, below.

FIG. 4 shows one example of an element table.

An element table 400 has information with respect to elements. The element table 400 has a record for each element, for example. Each record has an element ID, an element name, an element type, a layer name (name of a layer to which an element type of an element belongs), and an element detail. The element detail is detailed information with respect to an element, and examples thereof include a type and a name of a group to which an element belongs, and a storage capacity of an element (for example, the PG). A content of the element detail may differ depending on the element type of the element, for example.

FIG. 5 shows one example of a related element table.

A related element table 500 shows a mutual relation between elements. For example, the related element table 500 has a record for each element, and each record has an element ID and a child element ID (an ID of a child element of an element). The management server program 541 may use the ID of the selected element to specify the related element of the selected element from the related element table 500. For example, the management server program 541 is capable of specifying a lower related element from a record specified from the related element table 500 on the basis of a record having the ID of the selected element as the element ID, and is capable of specifying an upper related element from a record specified from the related element table 500 on the basis of a record having the ID of the selected element as the child element ID. Each record in the related element table 500 may have a parent element ID instead of or in addition to the child element ID.

FIG. 6 shows one example of a customer table.

A customer table 600 shows a relation between an element and a customer. For example, the customer table 600 has a record for each element, and each record has an element ID and a customer ID (an ID of a customer associated with the element).

FIG. 7 shows one example of an element table.

An event table 700 has information with respect to events that has occurred. The event table 700 has a record for each event, for example. Each record has an element ID (ID of an element in which an event occurs), an event type, an occurrence time point, and a message ID (an ID of a message of an event). The event types include a warning (for example, a relatively light fault) or an error (for example, a relatively serious fault), for example.

FIG. 8 shows one example of a customer details table.

The customer details table 800 has information with respect to customers. The customer details table 800 has a record for each customer, for example. Each record has a customer ID, a customer name, a grade (priority of a customer), a telephone number, and a mail address.

FIG. 9 shows one example of a screen transition table.

A screen transition table 900 has information with respect to histories of a screen (specifically, a view on a main area described later). The screen transition table 900 has a record for each screen, for example. Each record has a screen history ID, a screen type (for example, "list" (list of elements) or "E2E" (E2E partial topology)), a key element (element name of a key element in a screen), an element type (element type corresponding to the element list or an element type of a key element in the E2E partial topology), and a group type (type of a group associated with an element type corresponding to an element list).

On the basis of the management table group 543 including the tables shown in the forgoing FIG. 4 to FIG. 9, transition from the element list screen to the E2E partial topology screen, transition from the E2E partial topology screen to the element list screen, and transition from the E2E partial topology screen to another E2E partial topology screen are controlled. A specific example of the element list screen and the E2E partial topology screen will be described, below. It is noted that in the following description, to simplify the description, description of display being performed by "the management server 557 (the management server program 541)" may be omitted. When not all objects to be displayed are displayed in one screen in at least one of the element list screen and the E2E partial topology screen, it is possible to configure such that an undisplayed part is displayed by an operation such as scrolling and scaling.

Figure 10:
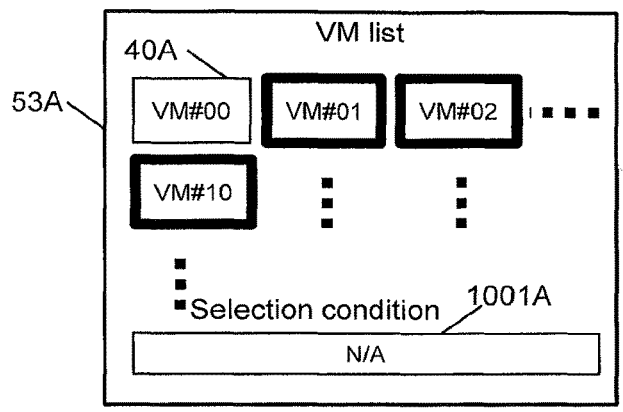
FIG. 10 shows a first example of an element list screen.

FIG. 10 shows one example of an element list screen.

An element list screen 53A is a screen for a list of elements (VMs) belonging to the element type "VM". The element list screen 53A has a plurality of element objects 40A respectively corresponding to a plurality of VMs and a selection condition entry field 1001A. The "element object" is a display object of an element. The element object (and a layer object and an element type object described later) may be realized by at least one of a figure, a text, and a pattern, etc., and, may be realized by a combination of a box and a text in the box, shown in the figure, for example. In the selection condition entry field 1001A, a condition with respect to an element selected is input by a user operation. The condition may be selected from a pull-down menu, etc., and may be manually input. The management server program 541 receives a selection of an element via the element list screen 53A. The receipt of the selection of the element may be a receipt of a manual selection of the element (element object) (for example, a click to the element object), or a receipt of a condition for the selection condition entry field 1001A. In the latter case, the element satisfying the input condition is selected by the management server program 541 on the basis of the element group 400, etc. For example, in a case of the VM, a user may designate a selection condition such as "an element in which a warning or an error occurs", and elements satisfying the designated selection condition may be collectively selected by the management server program 541. In an example of FIG. 10, three elements "VM #01", "VM #02", and "VM #10" are manually selected (bold frame).

Figure 11:
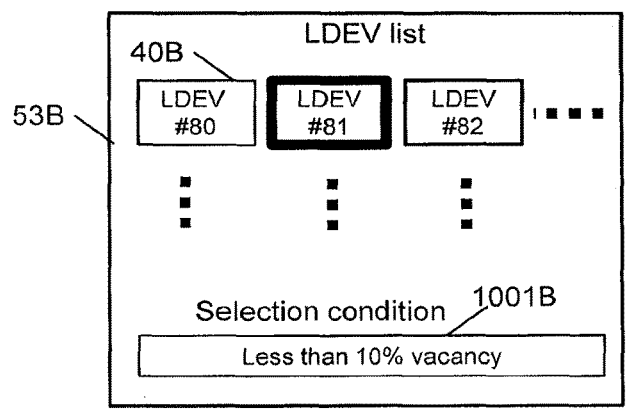
FIG. 11 shows a second example of an element list screen.

When the element types differ, a content to be displayed in the element list screen also differs. For example, as shown in FIG. 11, the element list screen 53B of the element type "LDEV" displays a list of elements (LDEVs) belonging to the element type "LEDV". The element list screen 53B also has a plurality of element objects 40B and a selection condition entry field 1001B. According to an example of FIG. 11, an element is selected in accordance with a condition input into the selection condition entry field 1001, and the selected element is one element "LDEV #81" only. That is, the elements selected from the element list screen may be two or more, and may be only one.

Figure 12:
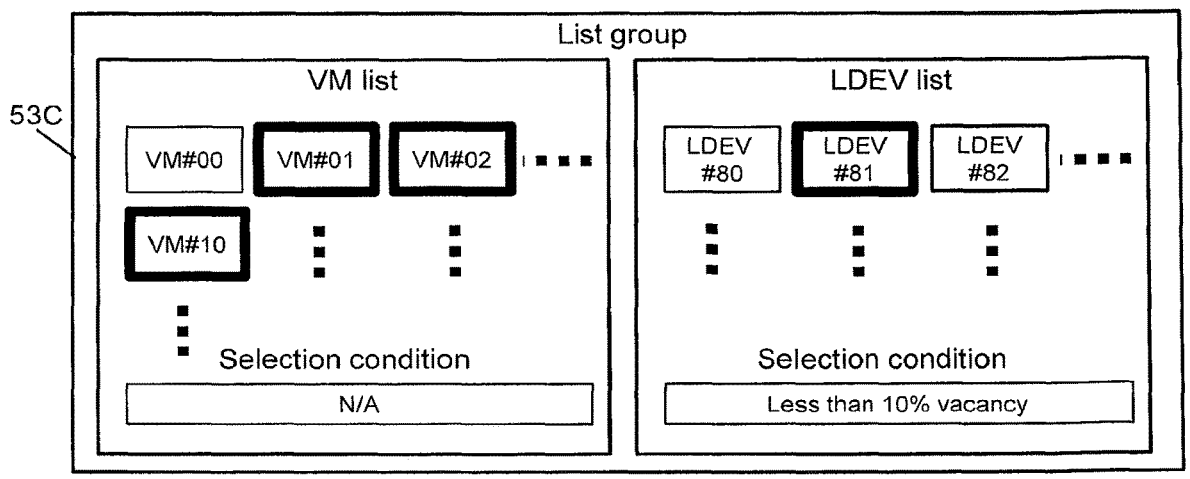
FIG. 12 shows a third example of an element list screen.

Further, it may suffice that an element is selected from the element list screen of some element types from among a plurality of element types, and the element list screen may display two or more element lists respectively corresponding to two or more element types. For example, as shown in FIG. 12, an element list screen 53C displays the two element lists respectively corresponding to two element types, "VM" and "LDEV". It is possible to receive the selection of elements from the two element lists respectively.

It is possible to transition the display from the element list screens (for example, 53A, 53B, and 53C) as described above to the E2E partial topology screen including the element related to the element (key element) selected from the element list screen. For example, the management server program 541 executes a screen transition from the element list screen to the E2E partial topology screen, upon detection of a predetermined user operation such as "E2E display" being selected from a menu opened by a right mouse click in a state in which the element is selected, the selected element object being dragged and dropped to a predetermined area (for example, a navigation area described later) on the GUI, or an E2E display button (not shown) being clicked in a state in which the element is selected.

Figure 13:
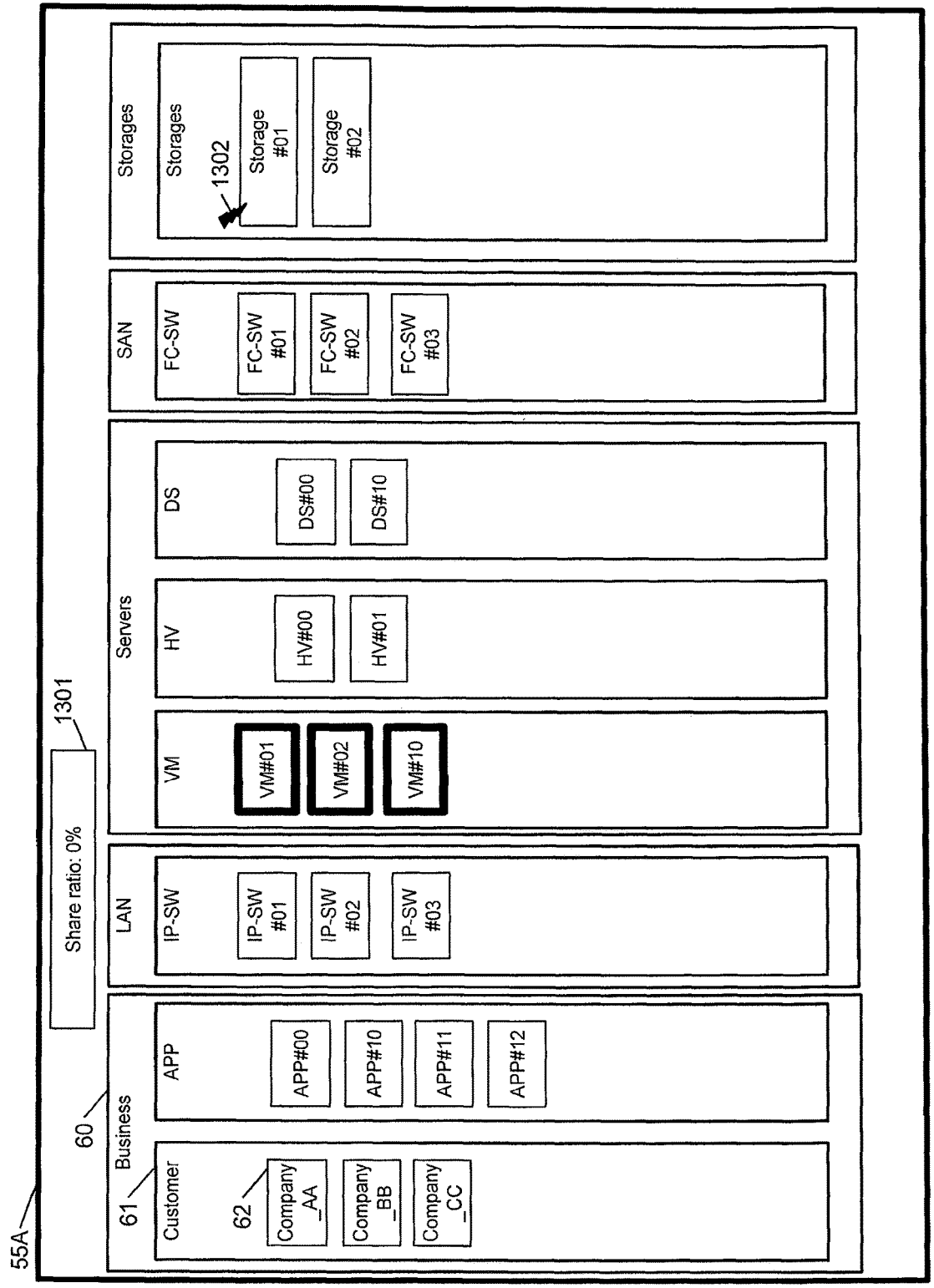
FIG. 13 shows a first example of an E2E partial topology screen.

FIG. 13 shows one example of an E2E partial topology screen.

An E2E partial topology screen 55A shown in FIG. 13 is a screen obtained after the transition from the element list screen 53A shown in FIG. 10. The E2E partial topology screen 55A is a screen that displays an E2E partial topology configured of elements (key elements) "VM #01", "VM #02" and "VM #10", and elements related to key elements "VM #01", "VM #02", and "VM #10" selected from the element list screen 53A.

Specifically, the E2E partial topology screen 55A has a layer object 60, an element type object 61, an element object 62, and a display condition entry field 1301, for example.

The layer object 60 is a display object of a layer. A plurality of layer objects 60 respectively corresponding to a plurality of layers are arranged along a hierarchy of the plurality of layers. In an example of FIG. 13, a screen left side is an upper side, and a screen right side is a lower side.

The element type object 61 is a display object of an element type. A plurality of element type objects 61 respectively corresponding to a plurality of element types are arranged along a hierarchy of a plurality of element types. The plurality of element type objects 61 are segmented by the layers. Specifically, the element type object 61 is displayed in the layer object 60 of a layer to which the element type corresponding to the element type object 61 belongs, for example.

The element object 62 is the display object of an element, as described above. A plurality of element objects 62 respectively corresponding to the key elements "VM #01", "VM #02", and "VM #10" and the related elements thereof are segmented by the element types. Specifically, the element object 62 is displayed in the element type object 61 of an element type to which an element corresponding to the element object 62 belongs, for example.

At least the element object 62, from among the layer object 60, the element type object 61, and the element object 62, is displayed in various modes. For example, frame lines of the element objects of the key elements "VM #01", "VM #02", and "VM #10" are bold. Further, on an element object of an element "Storage #01" in which a specific event occurs such as a fault (for example, a warning or an error), a mark 1302 indicating an event type (for example, a warning) is displayed.

The management server program 541 can control a content displayed in the E2E partial topology screen 55A with a user operation on the screen 55A or a previously configured condition, for example.

Figure 14:
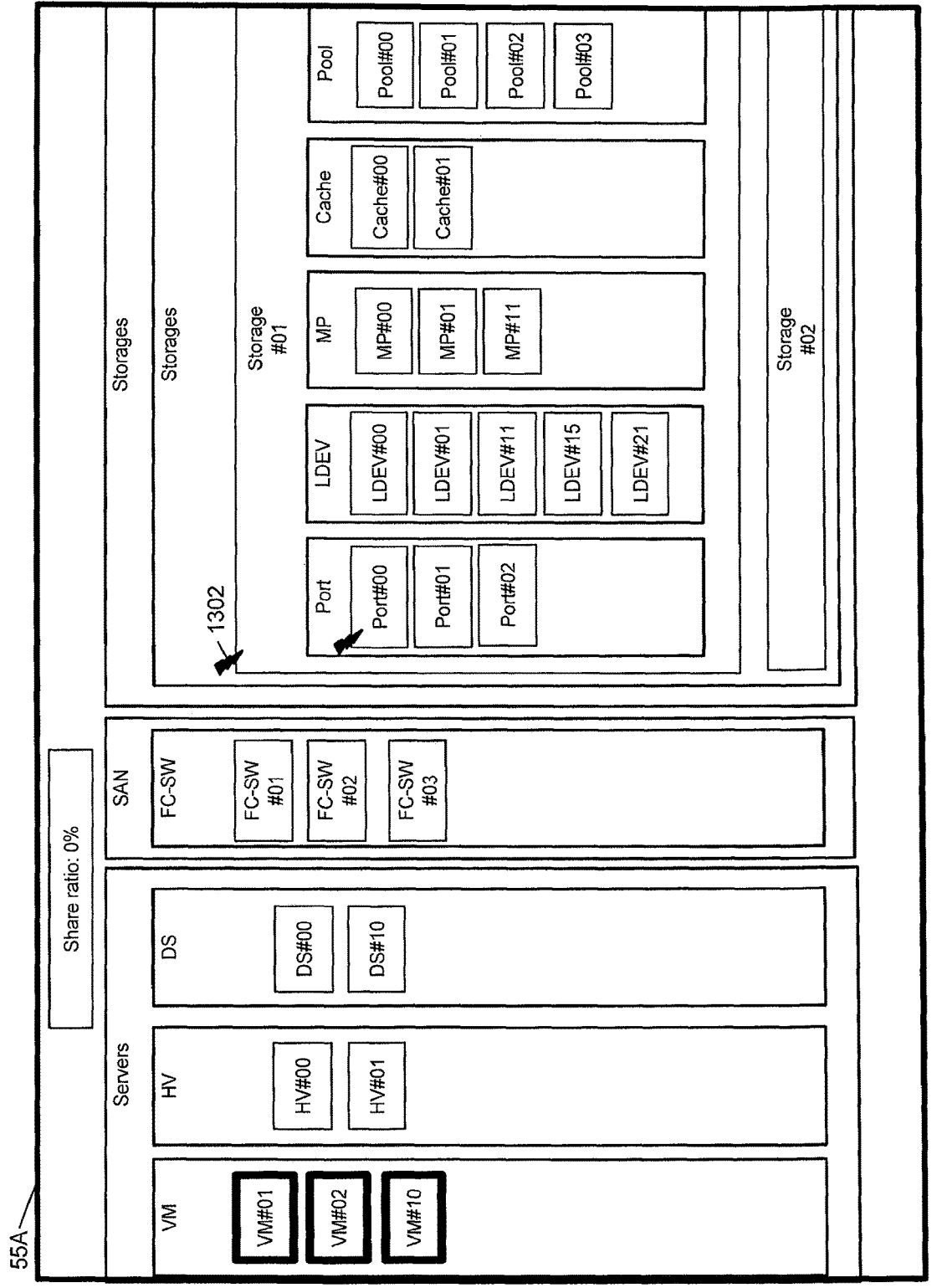
FIG. 14 shows a second example of an E2E partial topology screen.

For example, as shown in FIG. 14, in the element objects of a related element (for example, "Storage #01") containing a related element, an element object of all or some of the contained related elements and an element type object of the element type to which the element belongs may be displayed. According to an example of FIG. 14, in the element object of the related element "Storage #01", two or more element type objects respectively corresponding to two or more element types (for example, "Port", etc.) are displayed, and in the two or more element type objects, the related element (for example, "Port #00", etc.) is displayed. It is thereby possible to grasp the related element of the key elements "VM #01", "VM #02", and "VM #10" in more detail. It is noted that in the example of FIG. 14, from among the related elements "Storage #01" and "Storage #02" containing the related element, the related element "Storage #01" is used as an example, and the element object of the contained related element is displayed; in the related element "Storage #02", the element object of the contained related element may be similarly displayed. Further, whether the element object of the contained related element is displayed or not may be determined according to a configured predetermined condition, and may be determined upon receipt of a selection of whether or not the element object is displayed from a user for each related element containing the related element.

Figure 15:
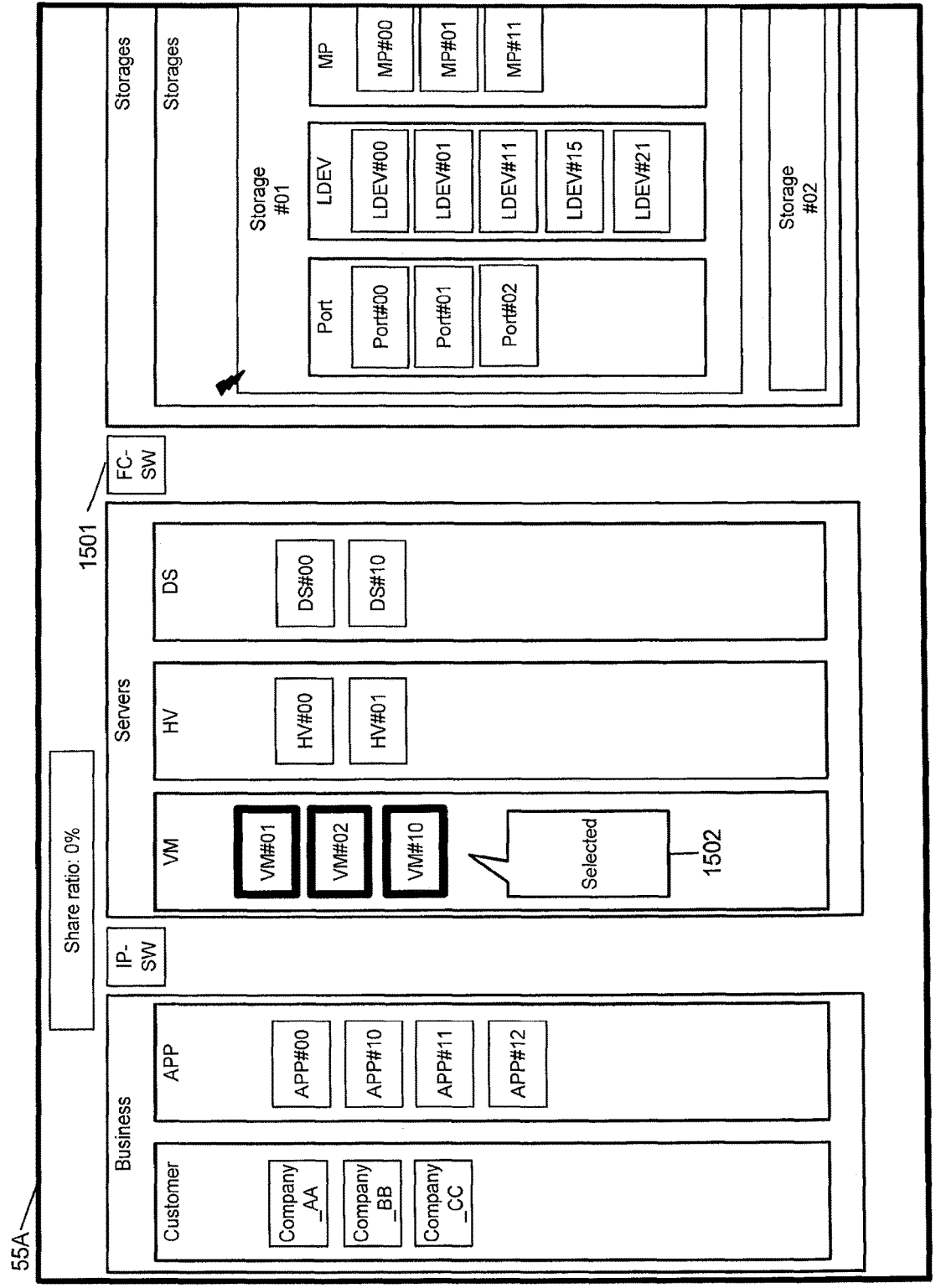
FIG. 15 shows a third example of an E2E partial topology screen.

Further, for example, a display priority is related for each element type (for example, a relation between the element types and the display priorities is registered in a table not shown in the management table group 543), and an element type object and an element object for an element type that is lower in display priority than a predetermined value may be reduced and displayed as one aggregate object (for example, "FC-SW") 1501 shown in FIG. 15. This enlarges a display range for a display object of an element type (for example, "Storages") of which the display priority is equal to or larger than a predetermined value, and it is possible to display more element objects for the element type of which the display priority is equal to or larger than a predetermined value. For example, the screen 55A shown in FIG. 15 has more element objects for the related element "Storage #01" displayed in one screen. As a result, it is possible to enhance visibility. Further, in order that the key element appears more conspicuous, a balloon indicating to be the key element (for example, a balloon having a comment as "Selected") 1502 may be displayed in the vicinity of the element object of the key element.

Further, for example, it is possible to control the element (element object) displayed in the screen 55A or the display mode of the element object according to a display condition input into the display condition entry field 1301. In the display condition entry field 1301, the display condition is input by a user operation. The display condition may be selected from a pull-down menu, etc., and may be manually input, or an input bar may be provided into which any numerical value between 0 to 100% is input. In the screen 55A shown as an example in FIG. 13 to FIG. 15, the display condition is "share ratio:0%", that is, a share ratio of related element=0%. The "share ratio" of the related element is a ratio of the number of key elements related to the related element to the total number of key elements. Specifically, for example, the share ratio of related element related to two key elements, from among three key elements, is ⅔×100 approximately equal to 67%. The share ratio=0% means that all the elements related to at least one key element correspond to the related elements to be displayed. Thus, in the screen 55A shown as an example in FIG. 13 to FIG. 15, a related element related to at least one key element, from among the key elements "VM #01", "VM #02", and "VM #10", is displayed.

Figure 16:
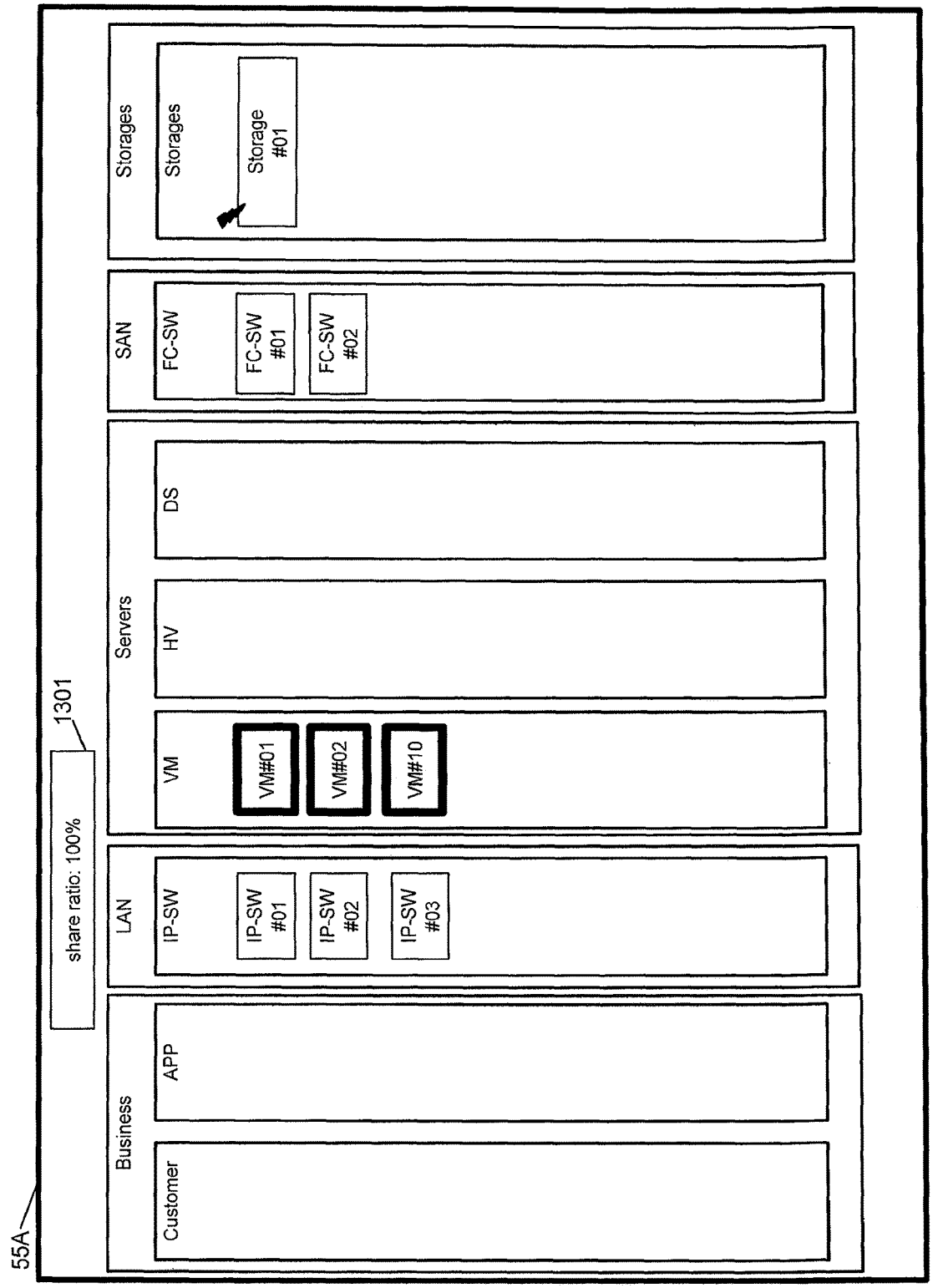
FIG. 16 shows a fourth example of an E2E partial topology screen.

Here, for example, as shown in FIG. 16, it is assumed that the display condition is "share ratio: 100%" and the display condition is input. The share ratio=100% means that from among the elements related to at least one key element, only the element related to all the key elements corresponds to the related element to be displayed. Therefore, as shown in FIG. 16, the element object displayed in the screen 55A is refined to the element object of the element related to all the key elements "VM #01", "VM #02", and "VM #10". It is noted that, in addition to the share ratio of 0 or 100, a share ratio having a user's desired value in a range of 0 to 100 may be input as the display condition.

Figure 17:
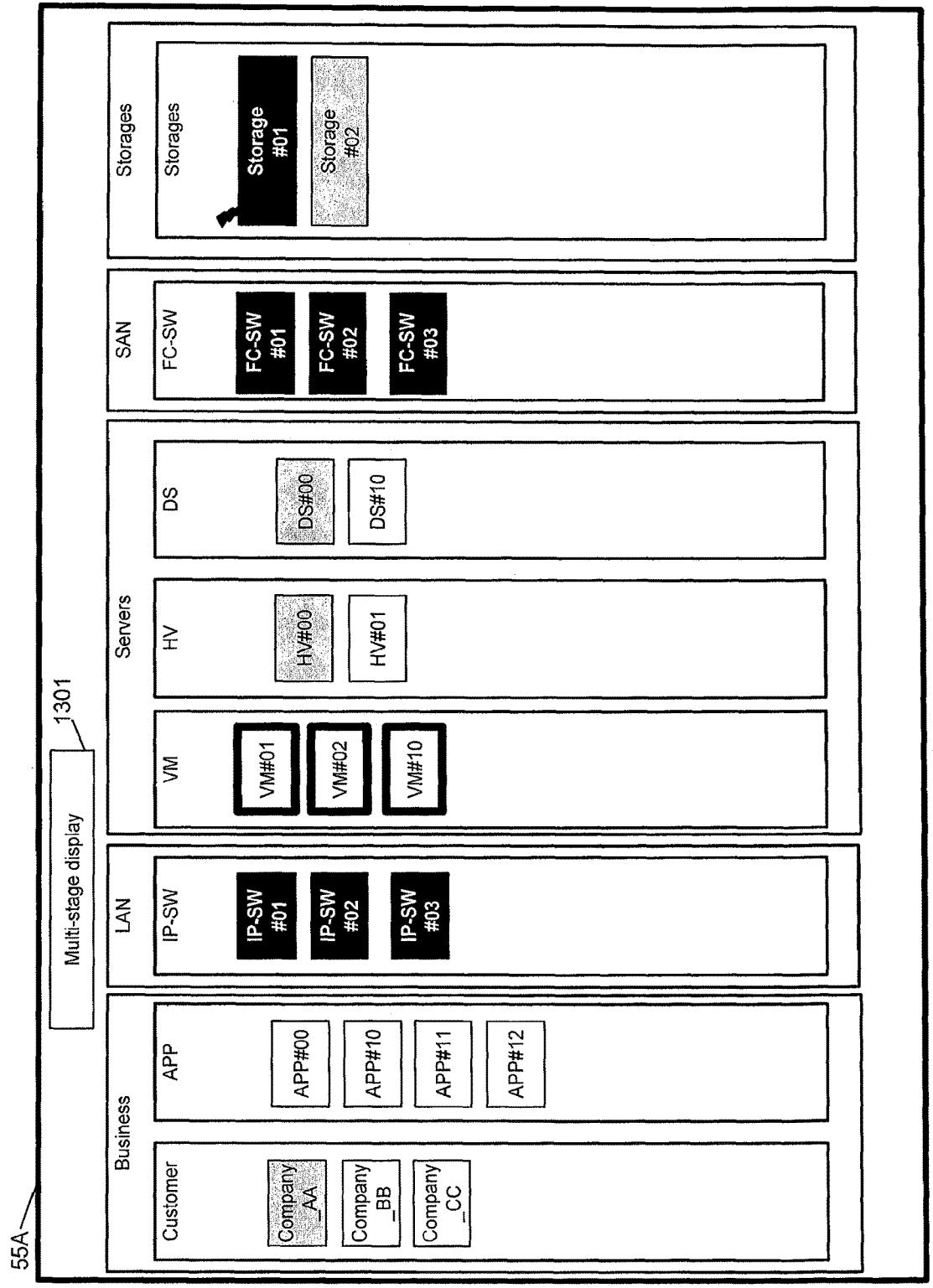
FIG. 17 shows a fifth example of an E2E partial topology screen.

Further, for example, as shown in FIG. 17, it is assumed that the display condition is "multi-stage display", and this display condition is input. The management server program 541 is capable of calculating the share ratio for each element related to at least one key element. The management server program 541 displays each element object of the related element related to at least one key element in a display mode that corresponds to a stage belonging to a share ratio calculated for the related element, from among display modes of a plurality of stages. For example, it is assumed that the display modes includes three stages, a background color of an element object of a related element of which the share ratio is equal to or larger than 0% and less than 50% is white, a background color of an element object of a related element of which the share ratio is equal to or larger than 50% and less than 100% is gray, and a background color of an element object of a related element of which the share ratio is 100% is black. A relation between the stages of the display mode (share ratio range) and the share ratio may be registered in a table not shown in the management table group 543. Further, the display mode may have more or less than three stages. Control (highlighting display control) of the display mode of the element object may be, in place of or in addition to the color of the background color, at least one of control operations of a pattern of the background, blinking of the background color, a size (for example, at least one of a width and a height) of the element object, a size of a text, and a color of a text, for example.

The meaning that the multi-stage display is possible in the E2E partial topology screen in the present embodiment is, for example, as follows: It may be more likely that a user's selection mistake of an element type that should be displayed in the element list or a selection mistake of an element that should be selected as an object to be analyzed from the element list occurs as the size or complexity of the computer system increases. The reason therefor is that it becomes more likely that a warning or an error message is issued by mistake due to a cause such as erroneous condition configuration to issue a warning or an error or a plurality of different events occur at the same time. Further, another reason is that a plurality of errors respectively occur at different time points, and at a time point of user analysis, the plurality of errors already occur. In particular, it is considered to be highly likely that a selection mistake of an element type or an element occurs when there are two or more root causes of fault. Such selection mistake becomes noise in the analysis. The multi-stage display of the present embodiment is one of the features adopted in view of a problem inherent in a computer system to be managed. Even when the selection mistake (noise) occurs, it is possible to estimate that the display mode (share ratio) of the element object of the element related to the erroneously selected element is weaker than the display mode of the element object of the element related to the element that should be correctly selected. This facilitates a user to specify the related element that should be prioritized. It is noted when there are more stages, the configuration is closer to a so-called heat map. This is effective when there are many elements to be examined.

Figure 18:
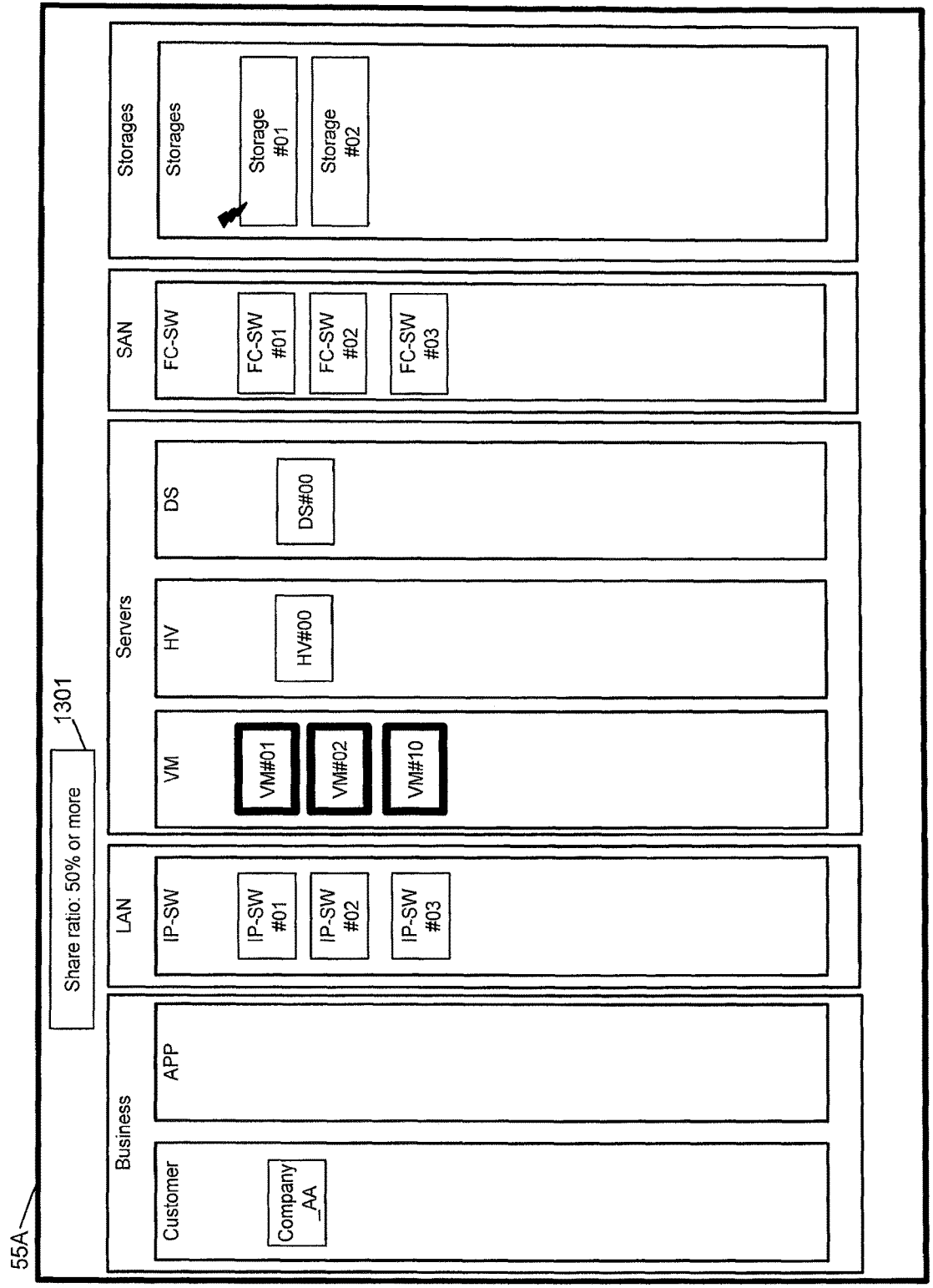
FIG. 18 shows a sixth example of the E2E partial topology screen.

Now, for example, as shown in FIG. 18, it is assumed that the display condition is "share ratio: 50% or more", and this display condition is input. The management server program 541 selects, from among the elements related to at least one key element, only a related element of which the share ratio is equal to or larger than 50% (only an element object of which the background color is gray or black in the screen 55A of FIG. 17) as an element to be displayed. In this way, the display condition may adopt a combination of the share ratio and a threshold value thereof. The display condition may be a condition that the share ratio is less than P % (P is a numerical value larger than 0 and equal to or less than 100), or a condition that the share ratio is equal to or larger than Q % and less than P % (Q is a numerical value equal to or larger than 0 and less than 100%). The threshold value of the share ratio may also be a value desired by a user.

In this way, the display condition may adopt various conditions. For example, the display condition may adopt a combination of the share ratio and the threshold value thereof as described with reference to FIG. 18 and the multi-stage display as described with reference to FIG. 17. For example, when the display condition is "share ratio: equal to or larger than 50% and the multi-stage display" and the display mode has three stages, the background color of the element object of the related element of which the share ratio is equal to or larger than 50% and less than 75% may be white, the background color of the element object of the related element of which the share ratio is equal to or larger than 75% and less than 100% may be gray, and the background color of the element object of the related element of which the share ratio is 100% may be black.

Figure 19:
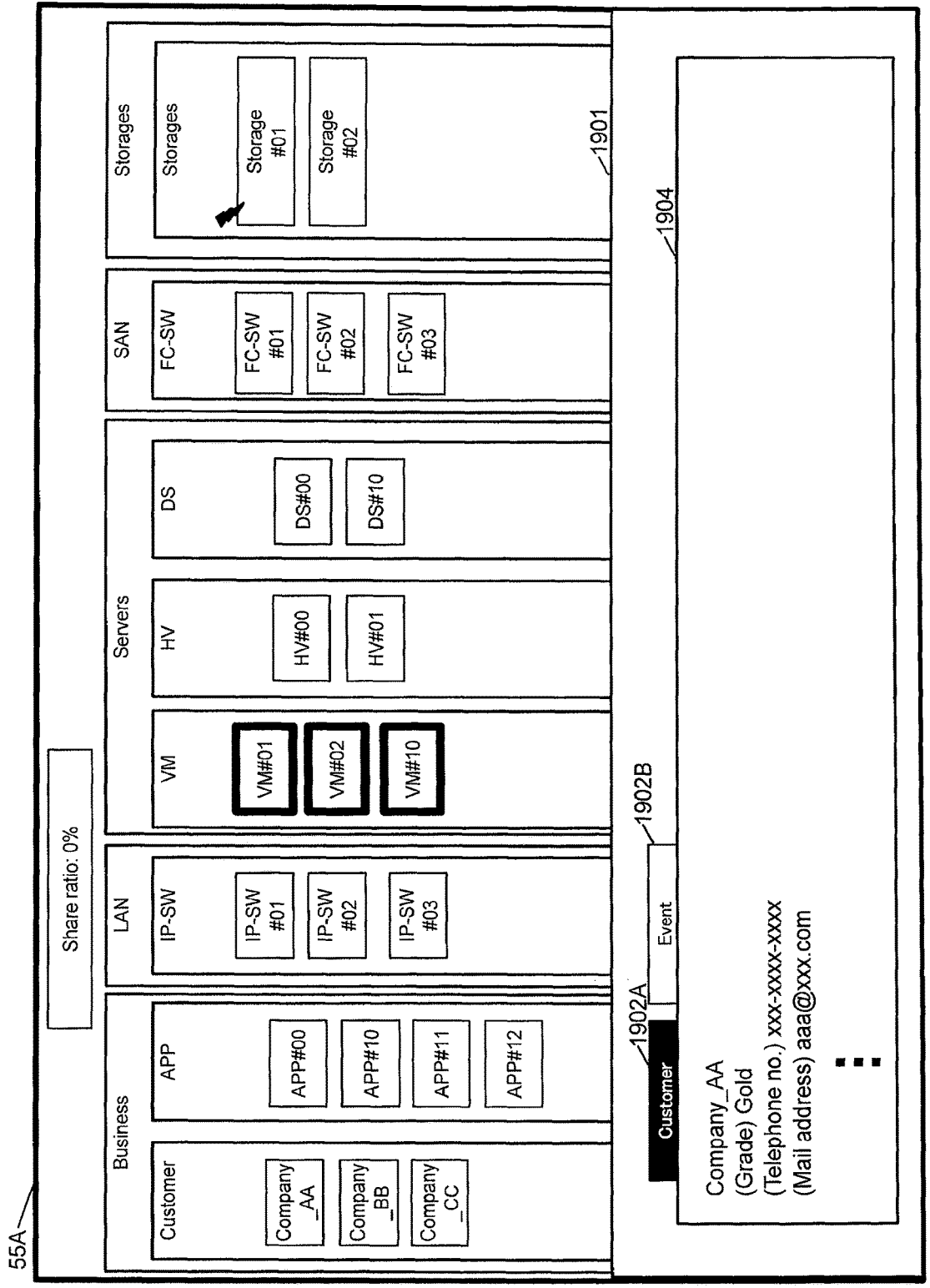
FIG. 19 shows a seventh example of an E2E partial topology screen.

Moreover, for example, when a user operation for displaying the detailed information is performed on the screen 55A in any of FIG. 13 to FIG. 18, a detail about the E2E partial topology displayed by the screen 55A is displayed on the screen 55A (or another display area). FIG. 19 is an example in which the user operation for displaying the detailed information on the screen 55A of FIG. 13 is performed and a detail display box 1901 is thereby displayed on the screen 55A of FIG. 13. The detail display box 1901 has a "customer" tab 1902A, an "event" tab 1902B, and a detail display area 1904. In an example of FIG. 19, the "customer" tab 1902A is selected by the user operation, and therefore, the detailed information with respect to a customer is displayed in the detail display area 1904. Specifically, the management server program 541 specifies a customer associated with at least one of the key elements "VM #01", "VN #02", and "VM #10" and the detail thereof from the customer table 600 (see FIG. 6) and the customer details table 800 (see FIG. 8), and displays the specified information in the detail display area 1904. The user is thereby capable of knowing the detailed information with respect to the customer, as for the key element. It is noted that in the detail display area 1904, instead of or in addition to the key element, information may be displayed as for the customer of the related element (for example, a related element of which the share ratio is equal to or larger than a predetermined value).

Figure 20:
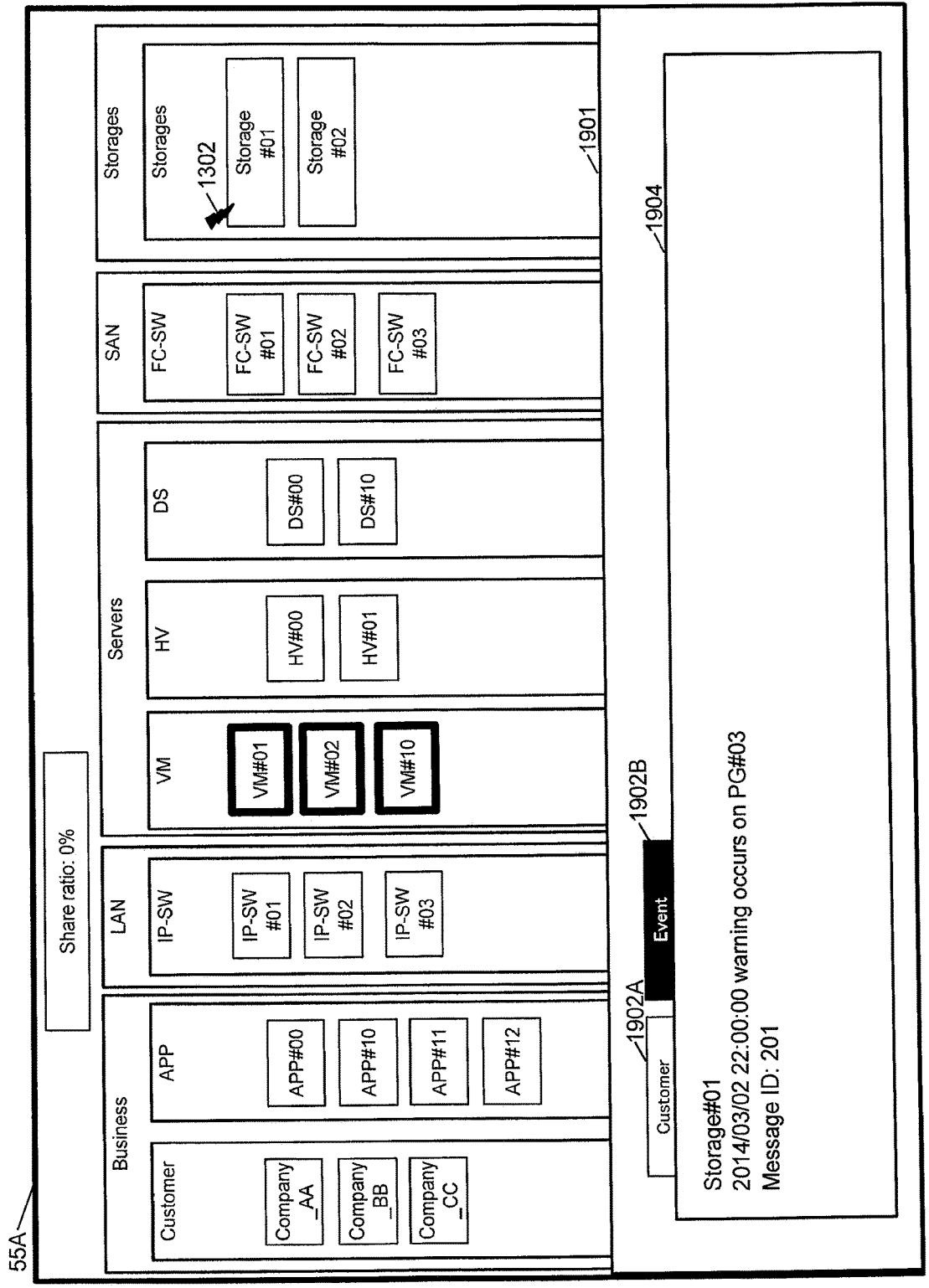
FIG. 20 shows an eighth example of an E2E partial topology screen.

When the "event" tab 1902B is selected by the user operation, as shown in FIG. 20, in the detail display area 1904, detailed information with respect to an event is displayed. Specifically, the management server program 541 specifies an element in which the event occurs and a content of the event with respect to the E2E partial topology displayed by the screen 55A from the event table 700 (see FIG. 7), and displays the specified information in the detail display area 1904. Thereby, the user is capable of knowing the element in which the event occurs (for example, the "Storage #01") and the content of the event (for example, an occurrence time point, and an event type) as for the E2E partial topology displayed by the screen 55A.

The display of the detail display box 1901 shown as an example in FIG. 19 and FIG. 20 may be performed on the element list screen in addition to (or instead of) the E2E partial topology screen.

Figure 21:
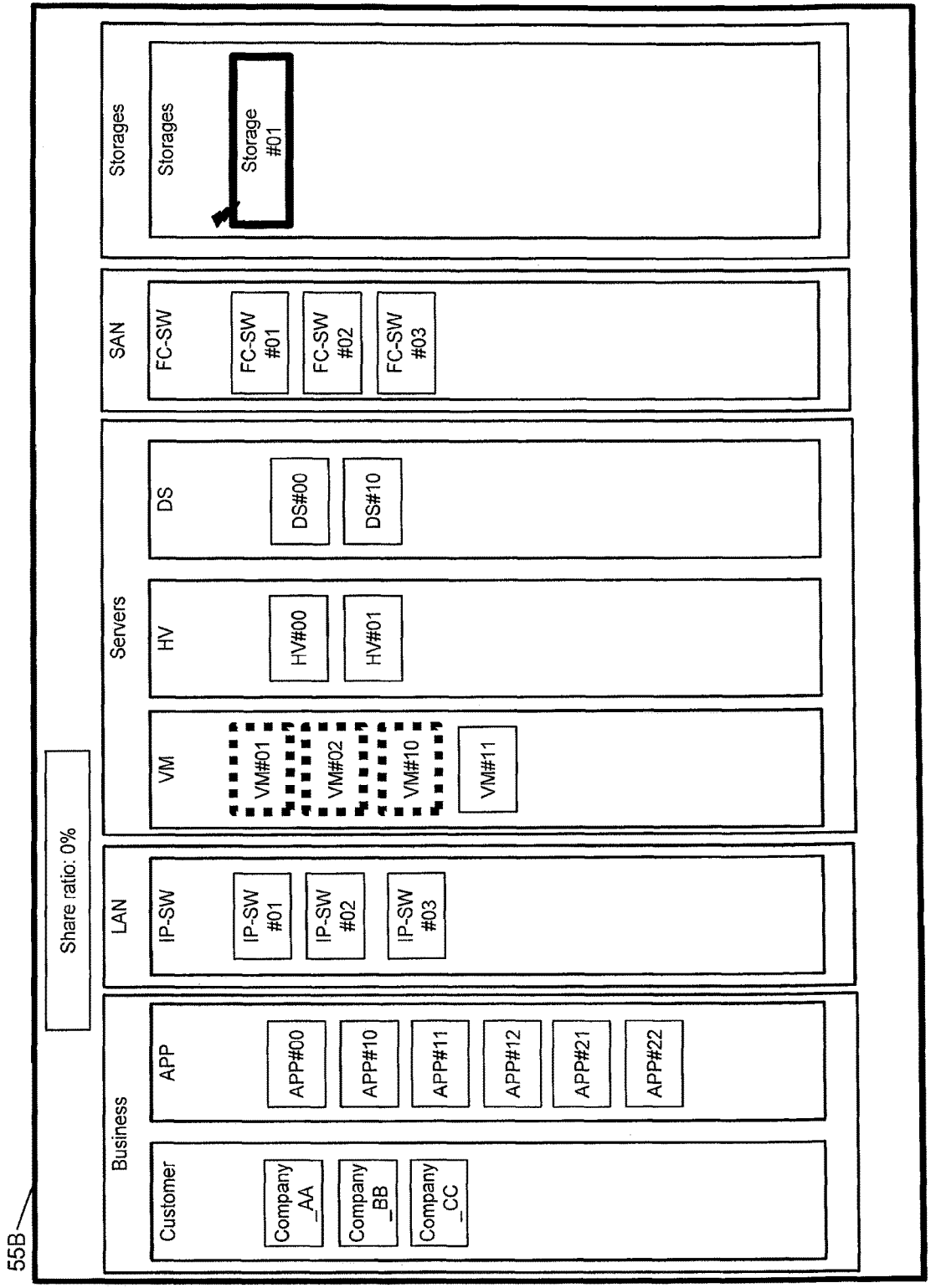
FIG. 21 shows a ninth example of an E2E partial topology screen.

Moreover, as described above, it is possible to transition from the E2E partial topology screen to another E2E partial topology screen. For example, when one related element "Storage #01" is selected (or a plurality of related elements are selected) and a user operation is performed for a viewpoint switch request (request for displaying the E2E partial topology where the selected related element "Storage #01" is used as the key element) is performed from the screen 55A of FIG. 13, another E2E partial topology screen 55B is displayed, as shown in FIG. 21. Specifically, the management server program 541 specifies an element related to the key element "Storage #01" from the related element table 500 (see FIG. 5), and displays the screen 55B of the E2E partial topology configured of the key element "Storage #01" and the specified related element. In this way, it is possible to select the key element from the related elements in the E2E partial topology (that is, it is possible to switch the key elements), and the E2E partial topology obtained after the key elements are switched is displayed. Thus, it is possible to easily specify the influence range of the fault (for example, a warning or an error). It is noted that in the screen 55B, the display mode of each of the element objects "VM #01", "VM #02", and "VM #10" which are the key elements in the screen 55A before the transition may be a display mode (for example, a dashed line bold frame) meaning that the corresponding element is a key element in the screen 55A before the transition.

As described above, it is possible to transition from the element list screen to the E2E partial topology screen, possible to transition from the E2E partial topology screen to the element list screen, and possible to transition from the E2E partial topology screen to another E2E partial topology screen. The element list screen and the E2E partial topology screen are displayed in a main area on the GUI, for example.

Figure 22:
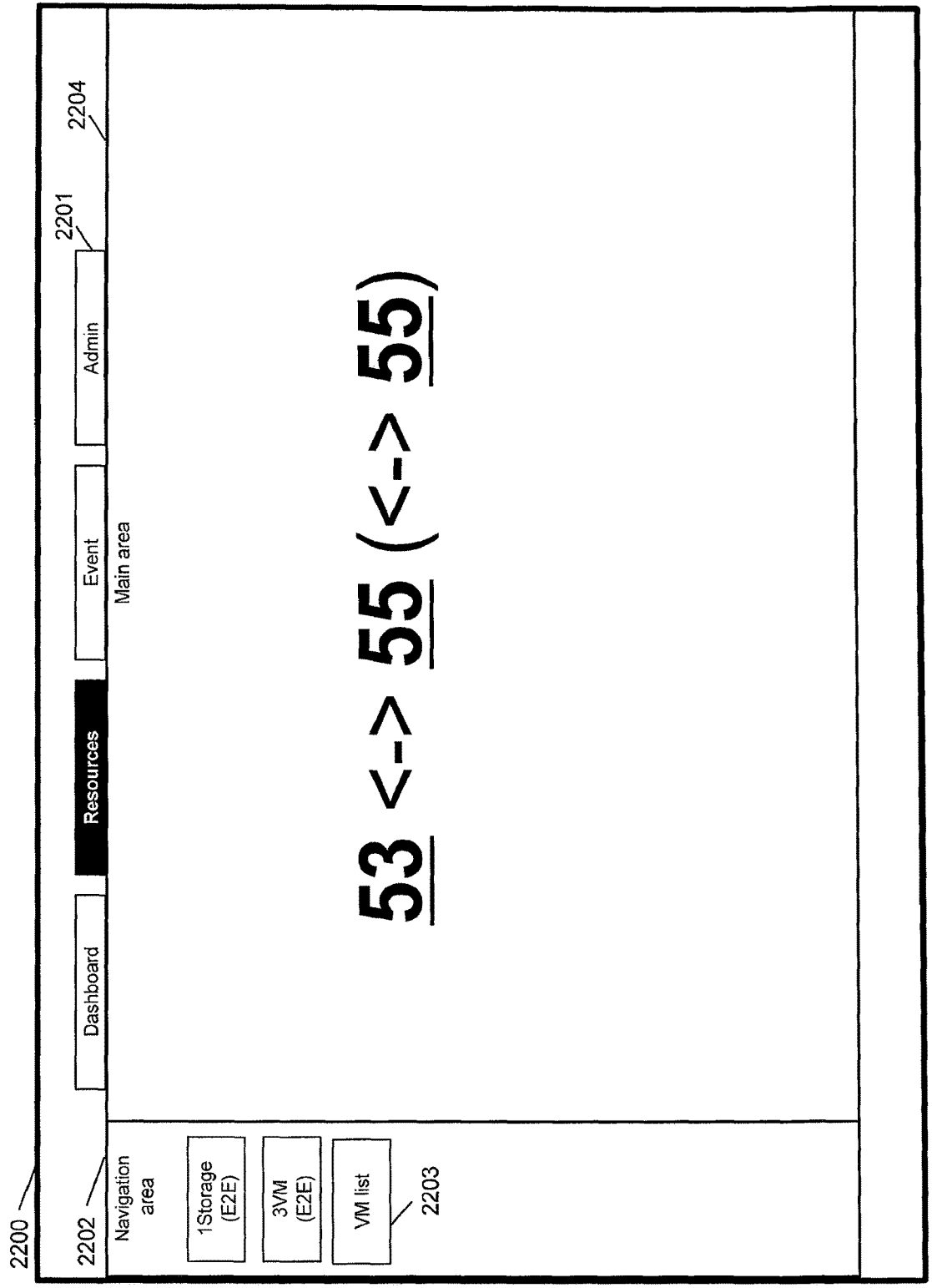
FIG. 22 shows one example of an entire configuration of a GUI.

FIG. 22 shows an example of an entire configuration of the GUI.

A GUI 2200 has a main area 2204, a plurality of tabs 2201, and a navigation area 2202.

The main area 2204 is a rectangular area. A content to be displayed in the main area 2204 is a content corresponding to a tab selected from the plurality of tabs 2201. For example, when a "Resources" tab is selected, in the main area 2204, a display according to "53<→55 (<→55)", that is, a display of the element list screen (53), transition from the element list screen (53) to the E2E partial topology screen (55), transition from the E2E partial topology (55) to the element list screen (53), and transition from the E2E partial topology screen (55) to another E2E partial topology screen (55), for example, are performed. In the present embodiment, in the main area 2204, the viewpoint switching (switching of focused screens) is performed in a mode in which the screen (55) is displayed instead of the screen (53) and another screen (55) is displayed instead of the screen (55); however, the viewpoint switching may be performed in a mode in which the screen (55) is displayed while the screen (53) is reduced.

The plurality of tabs 2201 are arranged on and along the upper side of the main area 2204.

In the navigation area 2202, every time the screen is displayed in the main area 2204, an icon 2203 of the displayed screen is displayed. An example of FIG. 22 reveals that the element list screen (53) of the element type "VM" is displayed from the main area 2204, then, the screen (55) of the E2E partial topology where three VMs are used as the key elements is displayed, and then, the screen (55) of the E2E partial topology where one storage system is used as the key element is displayed. When the icon 2203 of a desired screen is selected from the navigation area 2202, the management server program 541 refers to the screen transition table 900 (see FIG. 9) using the screen history ID of the selected icon 2203 as a key to thereby restore a screen corresponding to the selected icon 2203 in the main area 2204.

The navigation area 202 is an area long in a direction (for example, a vertical direction) orthogonal to a direction (for example, a horizontal direction) in which the tabs 2201 line up, and is arranged at a side (for example, at the left side of the GUI (or at the right side)) along a direction in which the tabs 2201 line up. Thus, the line of the tabs 2201 in the main area 2204 is not disturbed (the tabs 2201 are prevented from being a nested state) and the tabs 2201 are separated from the navigation area 2202, and as a result, it is possible to expect that a user has a feeling of working in a work space (navigation area 2202).

Several processes performed in the present embodiment will be described, below.

Figure 23:
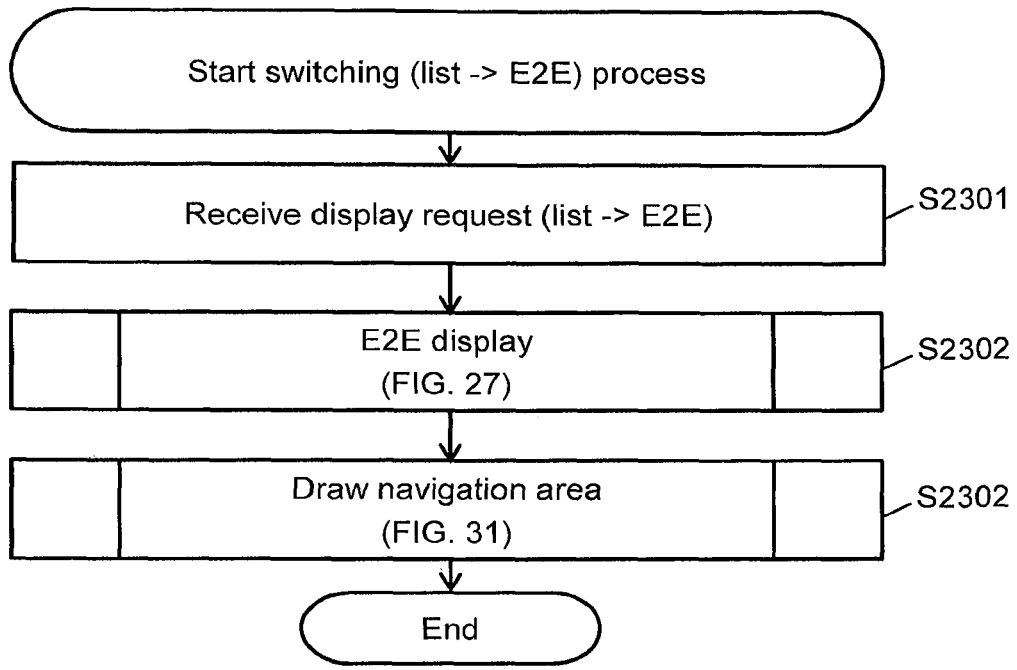
FIG. 23 shows a flow of a switching (list→E2E) process.

FIG. 23 shows a flow of a switching (list→E2E) process.

The management server program 541 receives a display request (list→E2E) (S2301). The display request (list→E2E) is a request for transition from the element list screen to the E2E partial topology screen, specifically, a request for displaying the screen of the E2E partial topology configured of the element (key element) selected in the element list screen and the related element related thereto. This request may be a request as a result of a user operation on the GUI. The management server program 541 executes an E2E display process (FIG. 27) to display the E2E partial topology screen (S2302), and executes a navigation area drawing process (FIG. 31) as a result of the E2E partial topology screen being displayed (S2303). It is noted that one element may be selected in the element list screen; however, when a plurality of elements are selected, the degree of complexity of a relation between the elements is increased, and thus, a technological effect of the present embodiment becomes more apparent.

Figure 24:
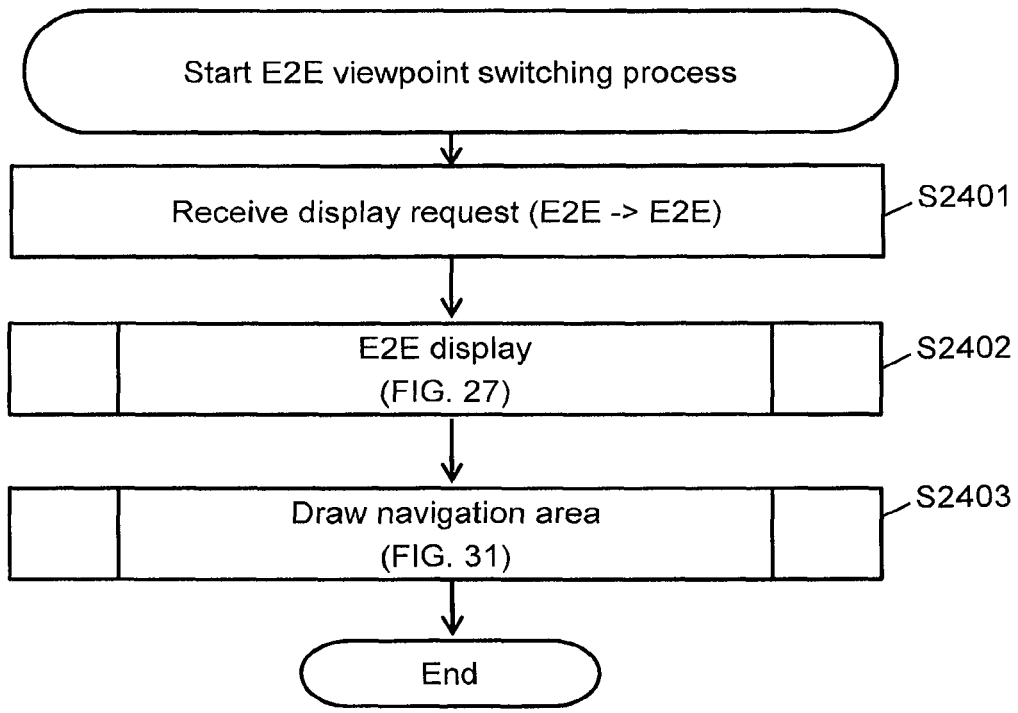
FIG. 24 shows a flow of an E2E viewpoint switching process.

FIG. 24 shows a flow of an E2E view point switching process.

The management server program 541 receives a display request (E2E→E2E) (S2301). The display request (E2E→E2E) is a request for transition from the E2E partial topology screen to another E2E partial topology screen, specifically, a request for displaying a screen of another E2E partial topology configured of the element (key element) selected in the E2E partial topology screen and the related element thereof. This request may be a request as a result of a user operation on the GUI. The management server program 541 executes the E2E display process (FIG. 27) to display another E2E partial topology screen (S2402), and executes the navigation area drawing process (FIG. 31) as a result of the E2E partial topology screen being displayed (S2403).

Figure 25:
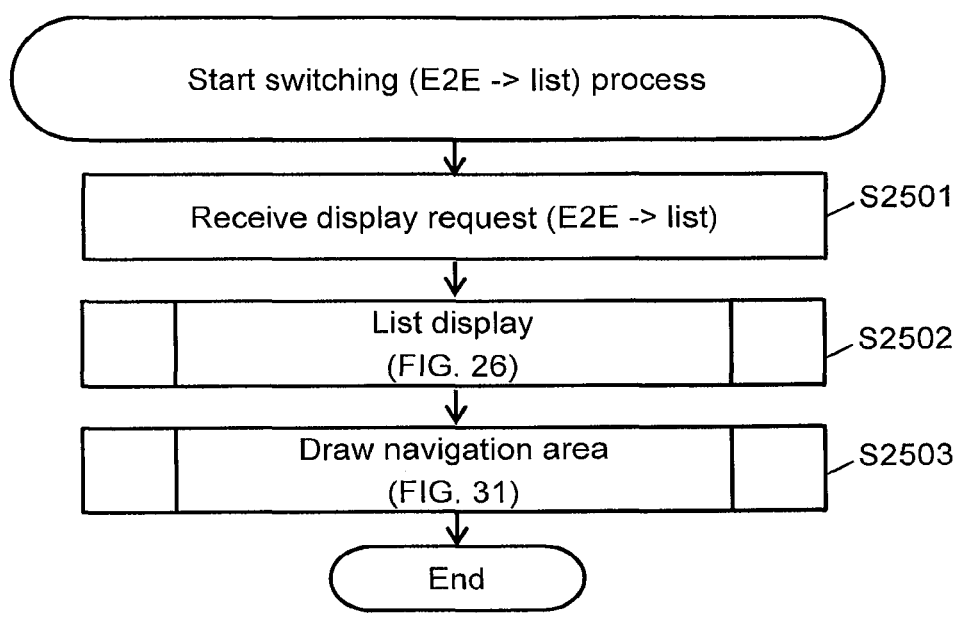
FIG. 25 shows a flow of a switching (E2E→list) process.

FIG. 25 shows a flow of a switching (E2E→list) process.

The management server program 541 receives a display request (E2E→list) (S2501). The display request (E2E→list) is a request for transition from the E2E partial topology screen to the element list screen, specifically, a request for displaying an element list screen of an element type (key element type) to which the element (key element) selected in the E2E partial topology screen belongs. This request may be a request as a result of a user operation on the GUI. The management server program 541 executes a list display process (FIG. 26) to display the element list screen (S2502), and executes the navigation area drawing process (FIG. 31) as a result of the element list screen being displayed (S2503).

Figure 26:
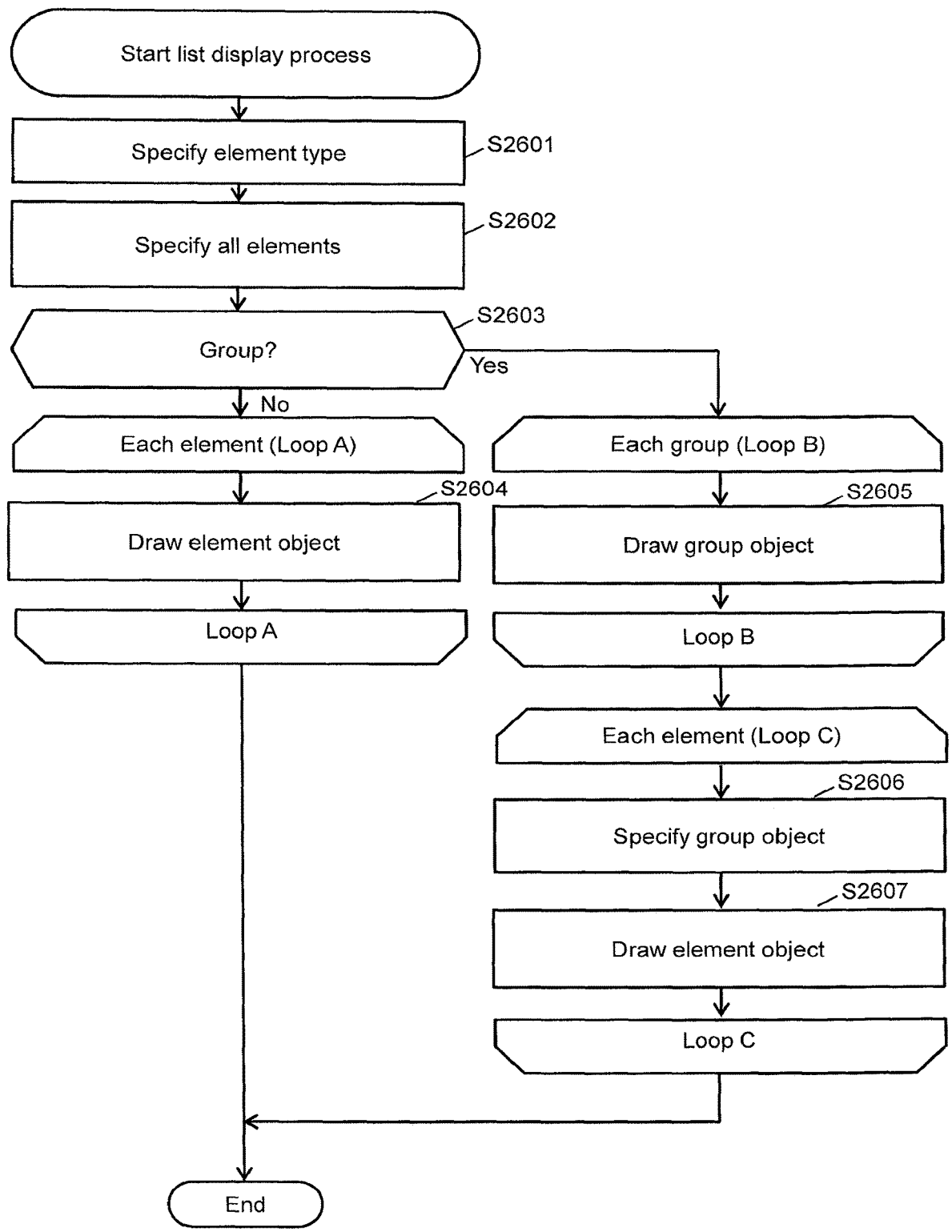
FIG. 26 shows a flow of a list display process.

FIG. 26 shows a flow of a list display process.

Figure 30:
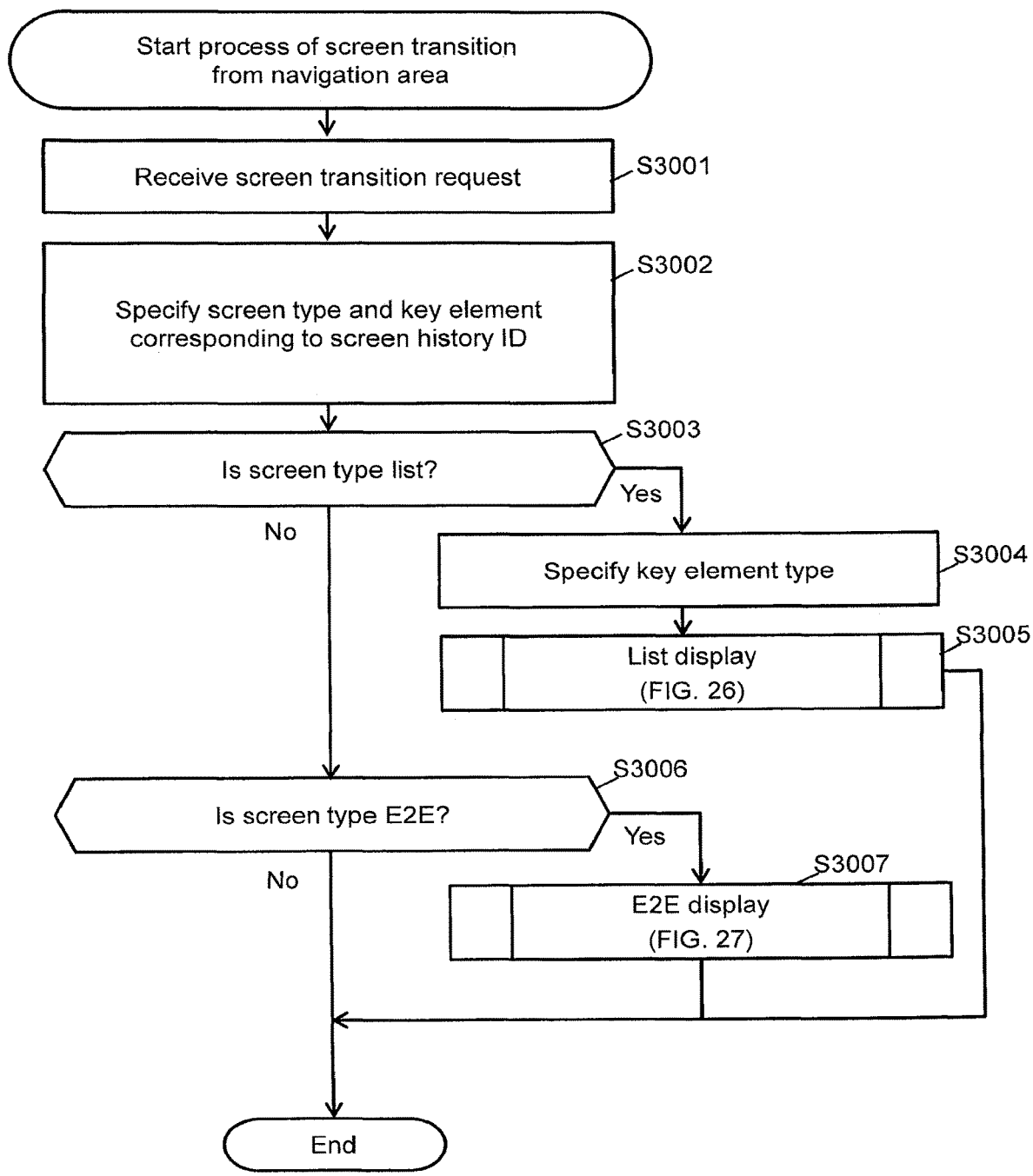
FIG. 30 shows a flow of a process of screen transition from a navigation area.

The list display process is performed in response to receiving the display request (E2E→list) (S2501 in FIG. 25), receiving the list display request, or specifying the key element (S3004 in FIG. 30). The display request (E2E→list) may include an element type name of the key element type, and the list reception request may include an element type name of the element type selected by a user operation, for example.

The management server program 541 specifies the element type on the basis of the received display request (E2E→list) or the list display request (S2601). When the element type is already specified (for example, S3004 in FIG. 30), S2601 may be skipped. The management server program 541 specifies all the elements belonging to the specified element type from the element table 400 (see FIG. 4) (S2602).

When groups are not associated with the specified element (S2603: No), the management server program 541 draws the element object for each element not associated with the groups, (S2604). Whether or not a group is associated with the specified element is determined from the element detail in a record of the element table 400.

Figure 32:
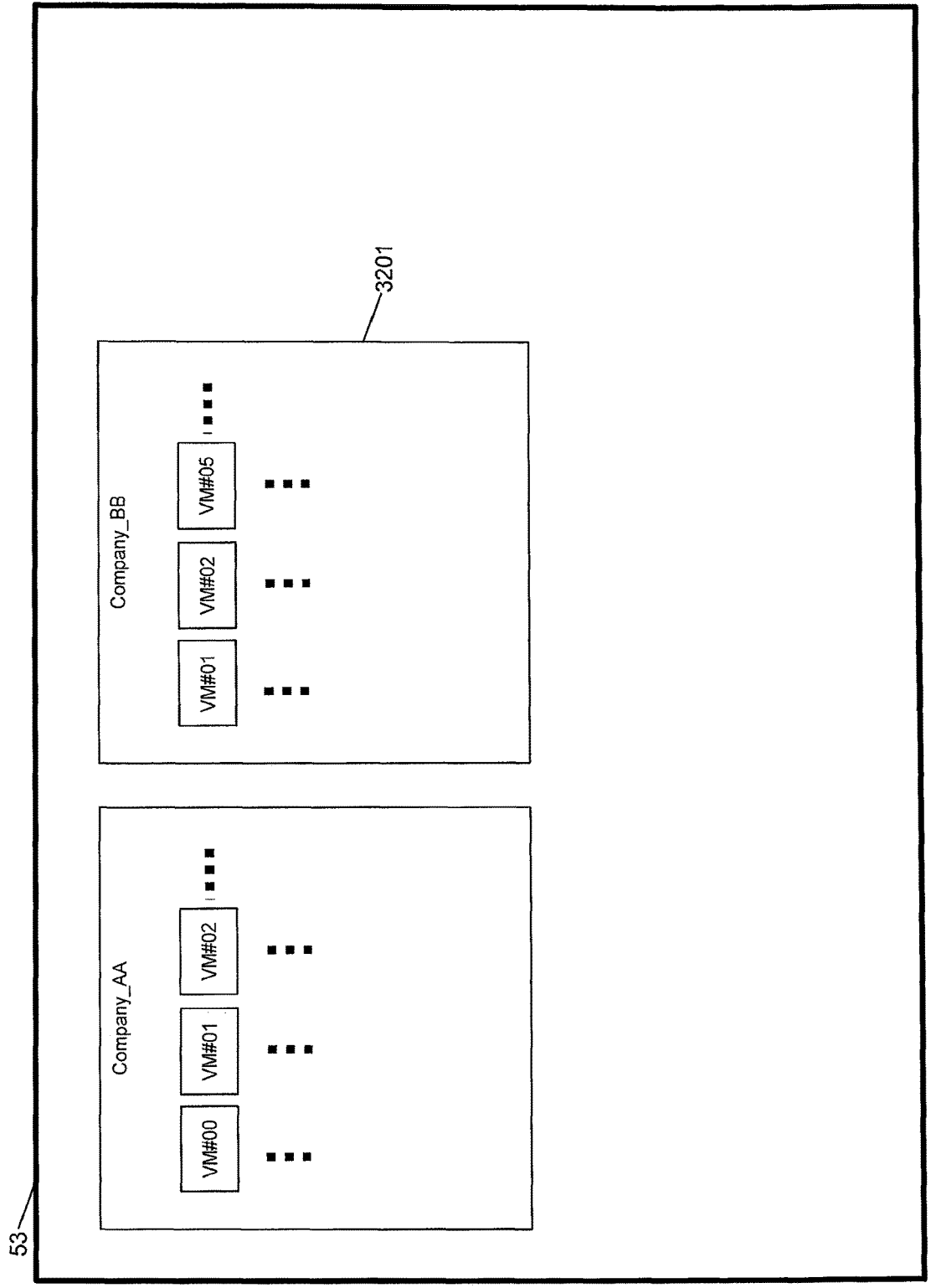
FIG. 32 shows a fourth example of an element list screen.

When a group is associated with the specified element (S2603: Yes), the management server program 541 draws the group object (display object of the group) for each group (S2605). Then, the management server program 541 specifies the group object of the group to which the element belongs, for each element associated with the group (S2606), and draws the element object of the element in the specified group object (S2607). In FIG. 32, the group object 3201 is drawn in the element list, and there is shown an example of the element list screen 53 in which the element object is drawn in the group object (screen of the element list of the element type "VM"). It is noted that drawing of the group object may also be applied to the E2E partial topology screen. For example, in the E2E partial topology, when groups of two or more related elements in the same element type are common with each other, two or more element objects respectively corresponding to the two or more related elements may be drawn or aggregated in the display object (one object) of the common group.

Through the above-described list display process, the element list of the element type is completed. It is noted that in the list display process, the element object to be drawn may be of a predetermined size, and may be scaled or aggregated according to the number of element objects.

Figure 27:
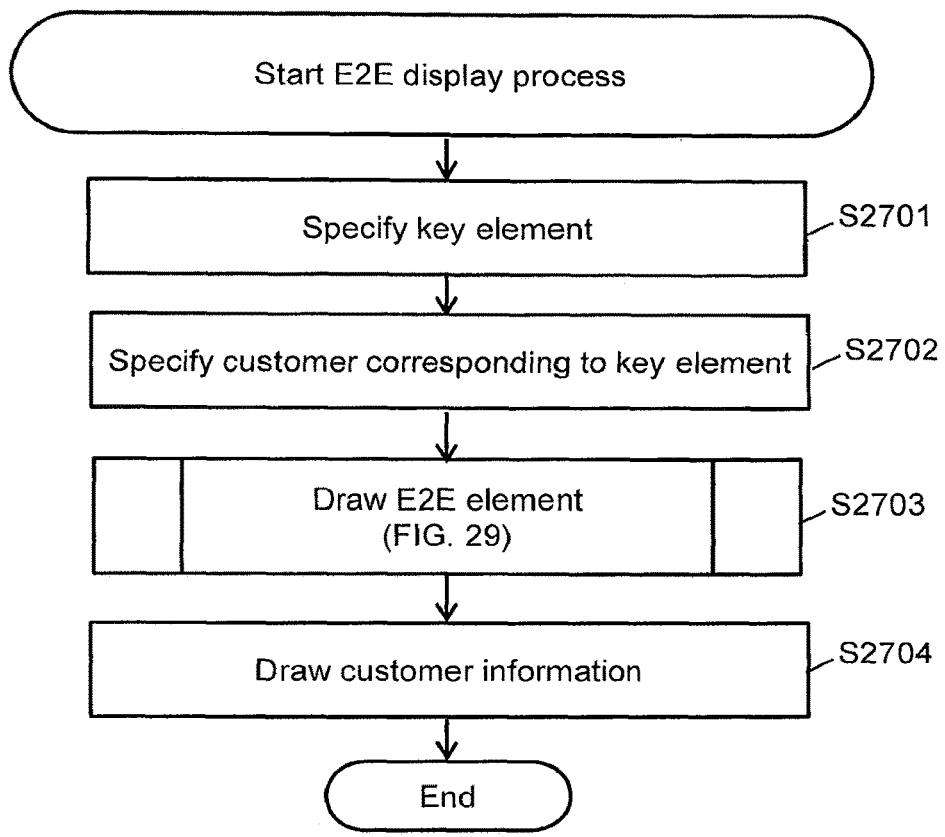
FIG. 27 shows a flow of an E2E display process.

FIG. 27 shows a flow of an E2E display process.

The E2E display process is performed in response to reception of a display request (list→E2E) (S2301 in FIG. 23), reception of a display request (E2E→E2E) (S2401 in FIG. 24), or S3006: Yes in FIG. 30. Each display request may include the element name of the selected element (key element).

The management server program 541 specifies all the key elements on the basis of the received display request (list→E2E) or the display request (E2E→E2E) (S2701). When the key element is already specified (for example, S3006: Yes in FIG. 30), S2701 may be skipped. The management server program 541 specifies the customer if the customer is associated with each of the specified key elements (S2702). The management server program 541 executes an E2E element drawing process (FIG. 29) (S2703). The management server program 541 draws customer information on the E2E partial topology screen when the display of the customer information is requested by a user operation (or irrespective of such a request) (S2704). The customer information may be information specified from the customer table 600 (see FIG. 6) and the customer details table 800 (see FIG. 8) (For example, see FIG. 19).

Figure 28:
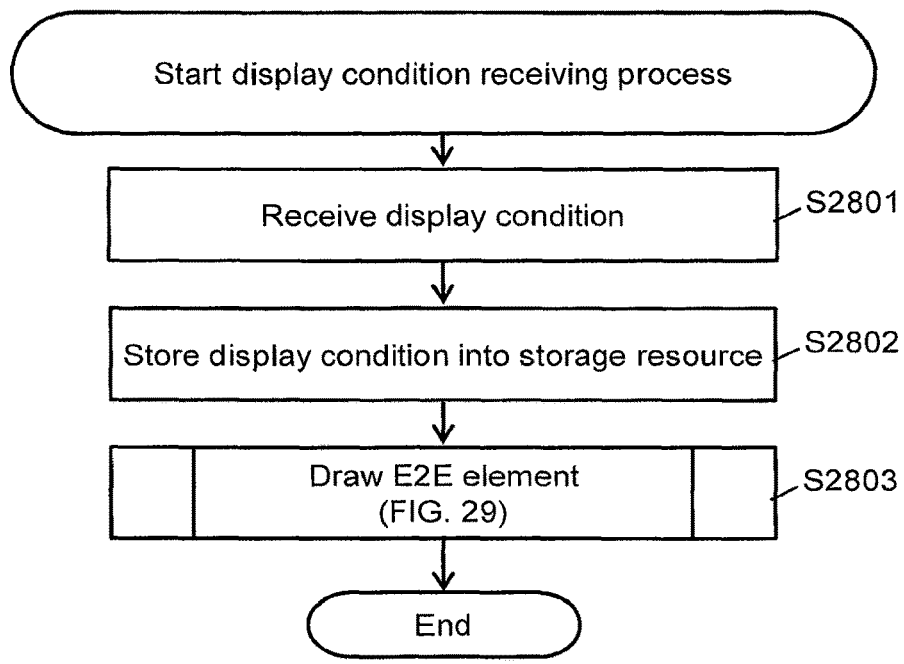
FIG. 28 shows a flow of a display condition receiving process.

FIG. 28 shows a flow of a display condition receiving process.

The management server program 541 receives the display condition (S2801). The display condition may be received through the display condition entry field in the E2E partial topology screen, and may be input from another screen different from that screen. Further, when the display condition is input, if the share ratio (or a threshold value thereof) is input, then the display condition may be input by a text, and may be input by adjustment of a slider bar. The management server program 541 stores the received display condition (for example, the share ratio) in the storage resource (for example, a memory) 535 (S2801), and executes the E2E element drawing process (FIG. 29) on the basis of the stored display condition (S2803).

Figure 29:
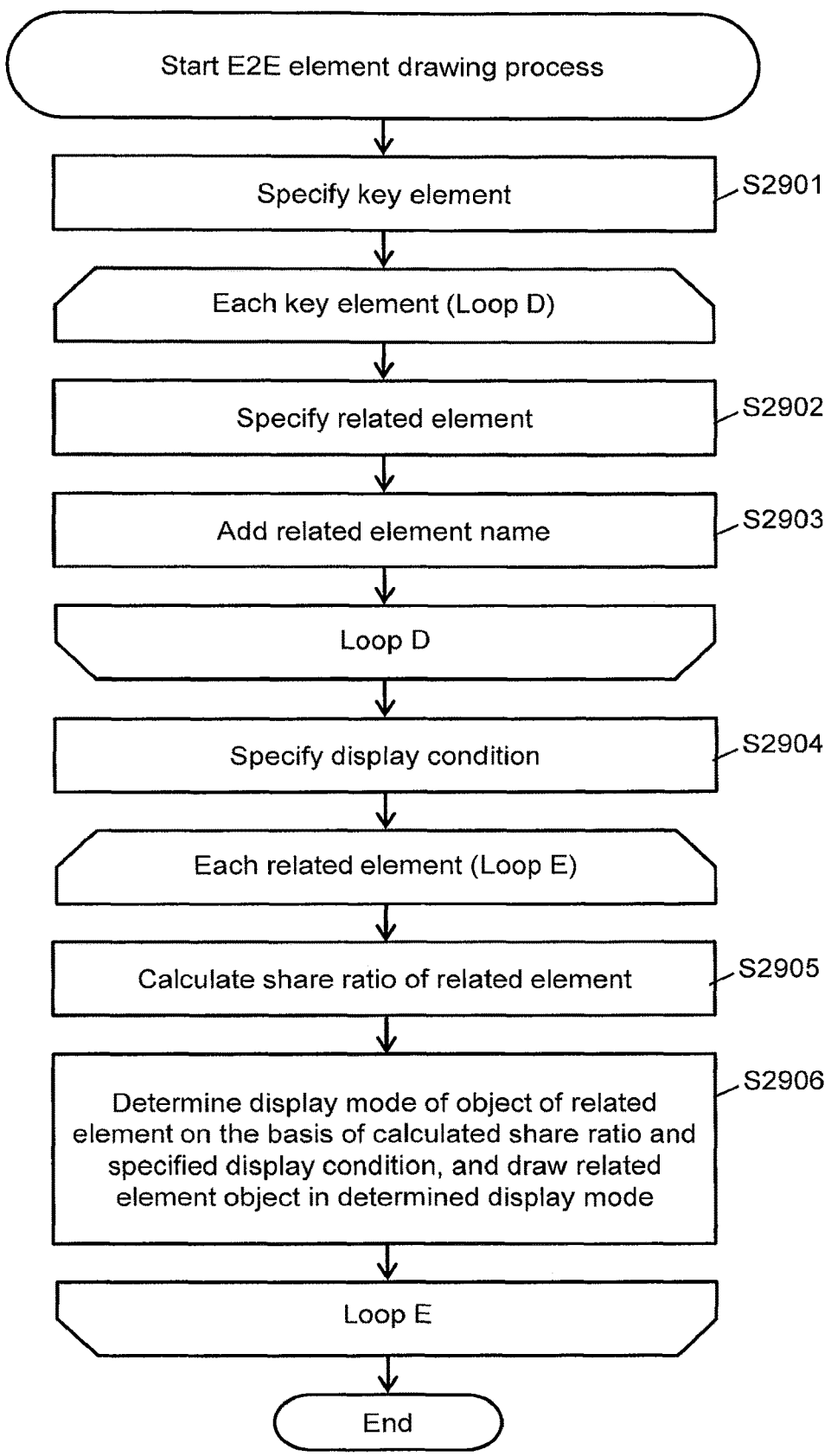
FIG. 29 shows a flow of an E2E element drawing process.

FIG. 29 shows a flow of an E2E element drawing process.

The management server program 541 specifies the key element (S2901), and executes 52902 and 52903 on each key element. In 52902, the management server program 541 specifies all the related elements for the key elements from the related element table 500. In 52903, the management server program 541 registers the related element name of the specified related element, for example, into a storage area in the storage resource 535.

The management server program 541 specifies the display condition (for example, the share ratio) from the storage resource 535 (S2904). The management server program 541 executes S2905 and S2906 on each related element registered in the storage area in the storage resource 535. In S2905, the management server program 541 calculates the share ratio of the related element. In the storage area, the number of key elements related to the related element is registered for each related element, for example. The management server program 541 calculates the share ratio of the related element on the basis of a total number of key elements and the number of key elements (the number of key elements related to the related element) specified from the storage area. In S2906, the management server program 541 determines the display mode of the object of the related element (including whether or not the related element is determined to be an object to be displayed) on the basis of the share ratio calculated in S2905 and the display condition specified in S2904, and draws the related element object in the determined display mode. In S2906, when the related element does not correspond to the display condition, the related element is not determined as the object to be displayed (a constituent element of the E2E partial topology). Further, if the specified display condition includes the "multi-stage display", for example, then, in S2906, the display mode of the element object of the related element is determined to be a display mode corresponding to the share ratio calculated for the related element.

It is noted that in S2906, when at least one of the layer object and the element type object in which the related element object of an object to be drawn will be arranged is not yet drawn, the object may also be drawn.

In the process shown in FIG. 29, at least one of the layer object, the element type object, and the element object, which are to be drawn, may be in a predetermined size, and may be scaled or aggregated according to at least one of the number of layer objects, the number of element type objects, and the number of element objects.

FIG. 30 shows a flow of a process of screen transition from the navigation area 2202.

The management server program 541 receives a screen transition request (S3001). The screen transition request is a request for displaying a screen corresponding to the icon 2203 selected from the navigation area 2202. The screen transition request may include the screen history ID corresponding to the selected icon 2203. The management server program 541 specifies a screen type and the key element corresponding to the screen history ID, from the screen transition table 900 (see FIG. 9) (S3002).

When the specified screen type is "list" (S3003: Yes), the management server program 541 specifies the element type (key element type) to which the key element specified in S3002 belongs, from the element table 400 (S3004), and executes the list display process (FIG. 26) (S3005).

When the specified screen type is "E2E" (S3003: No, S3006: Yes), the management server program 541 executes the E2E display process (FIG. 27) on the key element specified in S3002 (S3007).

Through the process shown in FIG. 30, a screen corresponding to the icon 2203 selected from the navigation area 2202 is restored. It is noted that when the screen type specified in S3002 is neither "list" nor "E2E", the process corresponding to the specified screen type may be performed (not shown).

Figure 31:
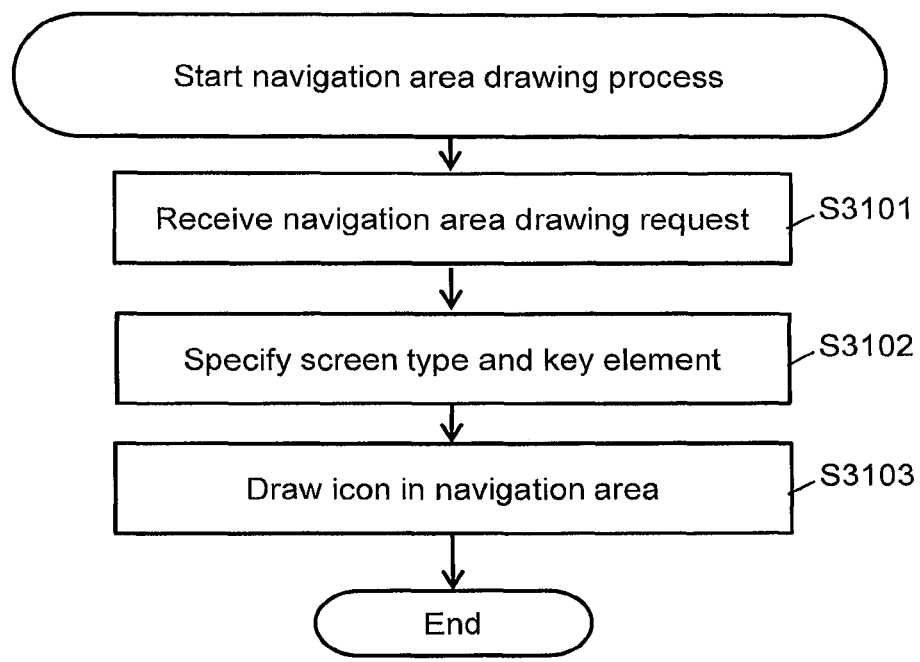
FIG. 31 shows a flow of a navigation area drawing process.

FIG. 31 shows a flow of a navigation area drawing process.

The management server program 541 receives a navigation area drawing request (S3101). The navigation area drawing request may occur each time the screen on the main area 2204 is updated (transitioned). The management server program 541 specifies a screen type of the screen after being updated (transitioned) and the key element for the screen (S3102). The management server program 541 adds the specified screen type and a record having a key element, etc., to the screen transition table 900 (see FIG. 9), and draws an icon (icon associated with the screen transition ID) corresponding to the screen after being updated (transitioned), in the navigation area 2202 (S3103).

As for the icon 2203 in the navigation area 2202, when the icon 2203 is selected and the screen is displayed in the main area 2204, for example, the icon 2203 may not be added. The icon 2203 may be deleted by a user operation. When the icon 2203 is deleted, the record corresponding to the deleted icon 2203 may be deleted by the management server program 541 from the screen transition table 900.

The above is several processes performed in the present embodiment.

Figure 33:
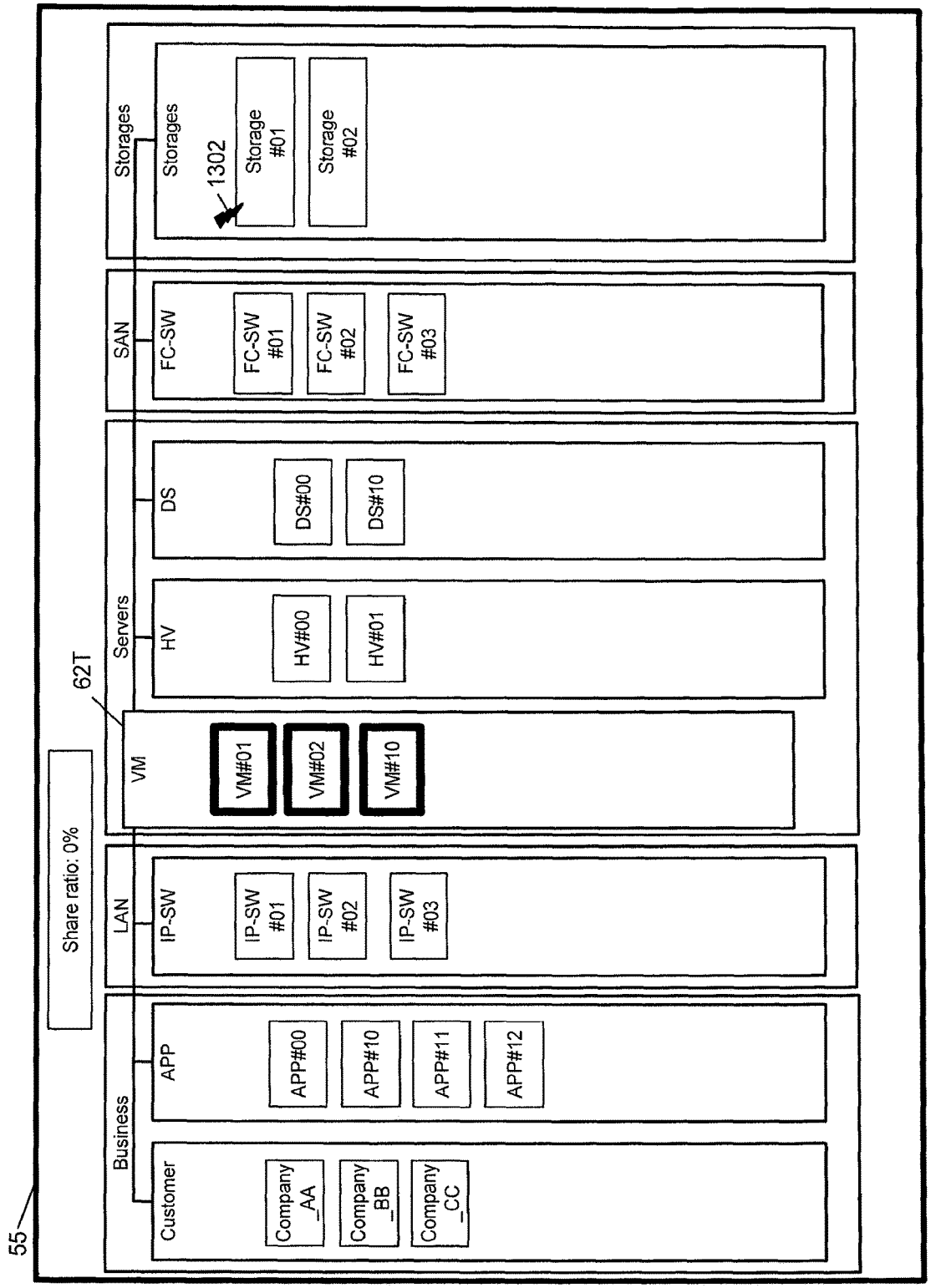
FIG. 33 shows a tenth example of an E2E partial topology screen.

In the present embodiment, a mode shown in FIG. 33 may be displayed in the E2E partial topology screen. Specifically, for example, the mode is as follows.

Generally, in the screen that displays a topology, the elements are connected by a line meaning a relation. However, as a result of an increase in size and complexity of the computer system, it is not possible to display the full topology in one screen, and even if it is possible to do so, there are many connection lines so three is a lack of visibility.

Therefore, in the present embodiment, a screen of the E2E partial topology where the element selected from the element list screen is used as a key is displayed. This enhances visibility. Further, in the present embodiment, it is possible to refine the related elements included in the E2E partial topology and combine the elements into a group on the basis of the display condition such as the condition about the share ratio. This contributes to further improvement in visibility.

Here, in the E2E partial topology screen, when the key element is arranged in the same row as the related element, it may be difficult to understand on what basis (key element) the E2E partial topology is refined and the correlation between the key element and the related element. Thus, the greater the number of key elements, the more influence it exerts.

Therefore, as shown in FIG. 33, the display object of the key element type (key element type including the key element) is expressly distinguished from the display object of another element type. For example, in the E2E partial topology screen 55, a display object 62T of the key element type "VM" is positioned higher than the display object of another element type. As a result, the display object 62T of the key element type "VM" becomes more conspicuous than the display object of another element type, and thus, the user is capable of easily specifying the key element type. It is noted that, as a method for making the key element type more conspicuous than another element type, instead of or in addition to providing a difference in the display positions of the display objects, it is considered that the display object of the key element type is connected in line to the display object of another element type (see FIG. 33), the display object of the key element type is emphatically displayed, or a combination of these is adopted, for example.

The above is description of the present embodiment. In the present embodiment, the processor of the management system is capable of inputting and outputting the information (for example, displaying the GUI and receiving the information input to the GUI) via an interface unit. The interface unit may include at least one of a network interface (for example, the I/F 537), an interface device for an input device, and an interface device for a display device. From among these interface devices, two or more interface devices may be one unit.

On the basis of the above description, it is possible to derive, for example, the following.

A first aspect: A processor of a management system displays an element list of some element types, from among a plurality of element types, and receives a selection of an element from the element list. The selection may be a manual selection and a selection according to the selection condition, as described above. The processor of the management system displays a topology configured of the element (key element) selected from the element list and a related element of the key element. The "related element of the key element" may be an element related to at least one of the key elements, and may be a related element, from among the elements, that satisfies a display condition described above (for example, a display condition other than the share ratio: 0%). The displayed topology is, for example, the above-described E2E partial topology and elements included in the topology are segmented by the element types. According to the first aspect, it is allowed to make a guess at refining elements according to a viewpoint of the key element from the element list of the element type, after that, the topology including the element related to the key element is displayed. This improves visibility and facilitates management such as a fault cause analysis.

A second aspect: In the first aspect, the plurality of element types have a hierarchical relationship. The displayed list is some of the plurality of element lists respectively corresponding to the plurality of element types having a hierarchical relationship. Related elements included in the topology includes an element related to two or more key elements, from among elements of all the element types other than some element types. The configuration of the topology is formed along the hierarchical relationship of the element types. According to the second aspect, visibility improves.

A third aspect: In the first or second aspect, the related element included in the topology is only an element which is related to all of two or more key elements, from among elements related to at least one of the two or more key elements. According to the third aspect, it is easy to specify the element related to all the key elements.

A fourth aspect: In any of the first to third aspects, a display mode of each of the related elements included in the topology depends on the share ratio of the related element. The share ratio of the related element is a ratio of the number of key elements related to the related element to a total number of key elements. According to the fourth aspect, even when a selection mistake (noise) occurs, the display mode (for example, the share ratio) of the element related to an erroneously selected element is different from the display mode of the element related to a correctly selected element, and thus, it is possible to easily specify the related element to be prioritized, from the displayed topology.

A fifth aspect: In any of the first to fourth aspects, the related element included in the topology is only a related element of which the share ratio satisfies a predetermined condition, from among the related elements related at least one of two or more key elements. According to the fifth aspect, it is possible to easily specify a related element of which the share ratio satisfies a predetermined condition from the displayed topology.

A sixth aspect: In any of the first to fifth aspects, information (for example, customer information or event information) related to some specific elements, from among the elements included in either one of the displayed list and the displayed topology is displayed, together with the list or the topology, by the processor of the management system. A display position of the information may be on the list screen or the topology screen, and may be at any position separate from the screen. According to the sixth aspect, it is possible to perform management such as analysis while observing additional information related to a specific element.

A seventh aspect: In any of the first to sixth aspects, the processor of the management system receives the selection of a new key element in the topology. The new key element is an element of an element type other than the element type of the key element selected in the list and an element from among the elements included in the topology. The processor of the management system displays another topology configured of the selected new key element and an element related to the new key element. According to the seventh aspect, it is possible to see another topology of which a key element is the element focused in the topology, and it is thereby possible to expect that the management such as specifying a fault influence range is facilitated.

In at least one of the first to the seventh aspects, the key element selected from the list may be one key element.

Thus, an embodiment is described; however, this is merely illustrative for a purpose of description of the present invention only, and does not intend to limit the scope of the present invention to this embodiment only. The preset invention can be executed also in other various forms.

REFERENCE SIGNS LIST

100: compute system, 555: management client, 557: management server

The invention claimed is:

1. A management method of a computer system in at least one computer coupled to the computer system including a plurality of elements which are classified into a plurality of element types, the method implemented until an element that is a basic cause of a fault or an influence range of the fault are narrowed down and comprising the steps of:
    displaying, on a user interface of the at least one computer, a list of elements which are classified into some element types from the plurality of elements types including elements in which at least one or more faults occurred among element types having at least one or more hierarchical relationships associated with at least one or more elements in which faults occurred;
    receiving a selection from a user of a specific fault occurring among the elements in the list displayed on the user interface;
    searching related elements which are related with the specific fault by referring to related information showing a relationship among the plurality of elements which are classified into the plurality of element types based on the selected specific fault occurring elements;
    switching from the displayed elements list in the step of displaying to displaying a topology on the user interface, the topology being configured by the selected specific fault occurring elements and the searched related elements which are related with the specific fault occurring elements, displaying the topology in which only the selected fault occurring elements and the searched related elements which are related with the specific fault occurring elements are separated by the element types and displayed in the hierarchical order horizontally; and
    repeatedly transitioning and displaying the topology information until an influence range of elements to be basic causes of the fault are narrowed down to fewer elements having a user inputted share ratio satisfying a predetermined condition, the share ratio being a ratio of a number of related elements relating to the selected specific fault occurring elements to a total number of the selected specific fault occurring elements and the displayed related elements are displayed in different stages according to respective share ratios of each of the displayed related elements.

2. The management method of the computer system according to claim 1, further comprising:
    in the topology in which the selected fault occurring elements and the searched related elements which are related with the specific fault occurring elements are separated by the element types, receiving selection of arbitrary related elements;
    implementing the steps of searching and switching based on the selected arbitrary related elements; and
    transiting to the topology which is configured by the selected arbitrary related elements and the related elements which are related with the selected arbitrary related elements and in which the selected arbitrary related elements and the related elements which are related to the selected arbitrary related elements are separated by the element types.

3. The management method of the computer system according to claim 1, wherein:
    in the topology in which the selected fault occurring elements and the searched related elements which are related with the specific fault occurring elements are separated by the element types, the element types and elements which are classified into the element types include an element type which is related to a customer related with a specific element and an element classified into the element type.

4. The management method of the computer system according to claim 3, wherein detailed information related to a customer is displayed in response to a user operation for detailed information display.

5. The management method of the computer system according to claim 4, wherein the detailed information includes at least one or more customer information among customer name, customer grade and customer contact destination.

6. The management method of the computer system according to claim 4, wherein the detailed information includes at least one or more event information among an element in which a event occurred, a type of the occurred event, and an event occurrence time as to elements related with the customer.

7. The management method of the computer system according to claim 1, wherein the element type which has hierarchical relationship and configuration of the topology is the one which follows the hierarchical relationship of the element type.

8. The management method of the computer system according to claim 1, wherein a display object of the selected specific fault occurring element is displayed with emphasis.

9. The management method of the computer system according to claim 1, wherein the at least one or more elements in which the fault occurred are elements in which specific events such as an alert and an error occurred.

10. The management method of the computer system according to claim 9, wherein a mark showing an event type is displayed on an object of an element in which the specific event occurred.

11. The management method of the computer system according to claim 1, further comprising the steps of:
receiving an input of the share ratio via a display condition input field after implementation of the step of switching; and
transiting to the topology in which the selected specific fault occurring elements and the related elements which are related to the specific fault occurring elements are separated by the element types based on a calculated shared ratio.

12. The management method of the computer system according to claim 1, wherein with reference to information showing display priority related to the element type, an object of the element type in which the display priority is low is reduced and the topology is displayed.

13. The management method of the computer system according to claim 1, wherein in display of the topology, a display object of an element type of the selected specific fault occurring element is explicitly separated from a display object of another element type and displayed.

14. A non-transitory computer readable storage medium which is configured to store a program making a computer executes, until an element that is a basic cause of a fault or an influence range of the fault are narrowed down, implementing steps of:
displaying, on a user interface of the computer, a list of elements which are classified into some element types from a plurality of elements types including elements in which at least one or more faults occurred among element types having at least one or more hierarchical relationships associated with at least one or more elements in which faults occurred;
receiving a selection from a user of a specific fault occurring among the elements in the list displayed on the user interface;
searching related elements which are related with the specific fault occurring elements by referring to related information showing a relationship among the plurality of elements which are classified into the plurality of element types based on the selected specific fault occurring elements;
switching from the displayed elements list in the step of displaying to displaying a topology on the user interface, the topology being configured by the selected specific fault occurring elements and the searched related elements which are related with the specific fault occurring elements, displaying the topology in which only the selected fault occurring elements and the searched related elements which are related with the specific fault occurring elements are separated by the element types and displayed in the hierarchical order horizontally; and
repeatedly transitioning and displaying the topology information until an influence range of elements to be basic causes of the fault are narrowed down to fewer elements having a user inputted share ratio satisfying a predetermined condition, the share ratio being a ratio of a number of related elements relating to the selected specific fault occurring elements to a total number of the selected specific fault occurring elements and the displayed related elements are displayed in different stages according to respective share ratios of each of the displayed related elements.

15. A management system in at least one computer coupled to a computer system including a plurality of elements which are classified into a plurality of element types and being configured to store a program making a computer execute, until an element that is a basic cause of a fault or an influence range of the fault are narrowed down, implementing steps of:
displaying, on a user interface of the at least one computer, a list of elements which are classified into some element types from the plurality of elements types including elements in which at least one or more faults occurred among element types having at least one or more hierarchical relationships associated with at least one or more elements in which faults occurred;
receiving a selection from a user of a specific fault occurring among elements in the list displayed on the user interface;
searching related elements which are related with the specific fault occurring elements by referring to related information showing a relationship among the plurality of elements which are classified into the plurality of element types based on the selected specific fault occurring elements;
switching from the displayed elements list in the step of displaying to displaying a topology on the user interface, the topology being configured by the selected specific fault occurring elements and the searched related elements which are related with the specific fault occurring elements, displaying the topology in which only the selected fault occurring elements and the searched related elements which are related with the specific fault occurring elements are separated by the element types and displayed in the hierarchical order horizontally; and
repeatedly transitioning and displaying the topology information until an influence range of elements to be basic causes of the fault are narrowed down to fewer elements having a user inputted share ratio satisfying a predetermined condition, the share ratio being a ratio of a number of related elements relating to the selected specific fault occurring elements to a total number of the selected specific fault occurring elements and the displayed related elements are displayed in different stages according to respective share ratios of each of the displayed related elements.

* * * * *